US011922877B2

(12) United States Patent
Kobayashi

(10) Patent No.: US 11,922,877 B2
(45) Date of Patent: Mar. 5, 2024

(54) DISPLAY DEVICE ENABLING BOTH HIGH-FREQUENCY DRIVE AND LOW-FREQUENCY DRIVE

(71) Applicant: Sharp Kabushiki Kaisha, Sakai (JP)

(72) Inventor: Fumiyuki Kobayashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/014,767

(22) PCT Filed: Jul. 22, 2020

(86) PCT No.: PCT/JP2020/028372

§ 371 (c)(1), (2) Date: Jan. 6, 2023

(87) PCT Pub. No.: WO2022/018842

PCT Pub. Date: Jan. 27, 2022

(65) Prior Publication Data

US 2023/0298522 A1 Sep. 21, 2023

(51) Int. Cl.

*G09G 3/3233* (2016.01)
*G09G 3/3258* (2016.01)

(52) U.S. Cl.

CPC ......... *G09G 3/3233* (2013.01); *G09G 3/3258* (2013.01)

(58) Field of Classification Search

CPC .. G09G 3/3233; G09G 3/3258; G09G 3/3283; G09G 3/3266; G09G 3/3291; H01L 27/1225

See application file for complete search history.

(56) References Cited

U.S. PATENT DOCUMENTS

| | | | | |
|---|---|---|---|---|
| 10,304,378 | B2 | 5/2019 | Lin et al. | |
| 2007/0018917 | A1* | 1/2007 | Miyazawa | G09G 3/3233 345/76 |
| 2007/0120785 | A1 | 5/2007 | Kimura | |

(Continued)

FOREIGN PATENT DOCUMENTS

| | | | |
|---|---|---|---|
| CN | 107680533 | A | 2/2018 |
| JP | 2014-139696 | A | 7/2014 |

(Continued)

OTHER PUBLICATIONS

Official Communication issued in International Patent Application No. PCT/JP2020/028372, dated Oct. 20, 2020.

*Primary Examiner* — Richard J Hong

(74) *Attorney, Agent, or Firm* — Keating & Bennett, LLP

(57) ABSTRACT

The present disclosure achieves a display device provided with a pixel circuit that enables both high-frequency drive and low-frequency drive without causing deterioration in display quality. In a pixel circuit (20), a holding capacitor (C1) is provided between a second control node (NA) connected to a data signal line via a write control transistor (T3) and a first control node (NG) connected to a control terminal of a drive transistor (T4). An oxide thin-film transistor (TFT) is employed for each of a first initialization transistor (T1) having a second conductive terminal connected to the first control node (NG) and a threshold voltage compensation transistor (T2) having a first conductive terminal connected to the first control node (NG).

18 Claims, 26 Drawing Sheets

(56) References Cited

U.S. PATENT DOCUMENTS

| | | | | |
|---|---|---|---|---|
| 2014/0340377 | A1* | 11/2014 | Kishi | G09G 3/3283 345/76 |
| 2015/0053935 | A1 | 2/2015 | Gupta et al. | |
| 2015/0243203 | A1* | 8/2015 | Kim | G09G 3/3291 345/212 |
| 2017/0365213 | A1* | 12/2017 | Rieutort-Louis | G09G 3/3233 |
| 2018/0277037 | A1 | 9/2018 | Lin et al. | |
| 2019/0035322 | A1* | 1/2019 | Kim | G09G 3/3233 |
| 2019/0251903 | A1* | 8/2019 | Morita | H01L 27/1225 |
| 2020/0202782 | A1 | 6/2020 | Huangfu et al. | |
| 2020/0410934 | A1* | 12/2020 | Jeon | G09G 3/3283 |
| 2021/0193049 | A1* | 6/2021 | Lin | G09G 3/3266 |
| 2023/0005415 | A1* | 1/2023 | Shang | G09G 3/3266 |
| 2023/0178569 | A1* | 6/2023 | Shima | H01L 27/1225 257/43 |

FOREIGN PATENT DOCUMENTS

| | | | |
|---|---|---|---|
| JP | 2016-534390 | A | 11/2016 |
| JP | 2020-509419 | A | 3/2020 |

* cited by examiner

| | P1 | P2 | P3 | P4 | P5 |
|---|---|---|---|---|---|
| T1 | OFF | ON | OFF | OFF | OFF |
| T2 | OFF | OFF | ON | OFF | OFF |
| T3 | OFF | OFF | ON | OFF | OFF |
| T5 | OFF | OFF | OFF | OFF | ON |
| T6 | OFF | OFF | OFF | OFF | ON |
| T7 | OFF | OFF | ON | OFF | OFF |

| | P1 | P2 | P3 | P4 | P5 |
|---|---|---|---|---|---|
| T1 | OFF | ON | OFF | OFF | OFF |
| T2 | OFF | OFF | ON | OFF | OFF |
| T3 | OFF | OFF | ON | OFF | OFF |
| T5 | OFF | OFF | OFF | OFF | ON |
| T6 | OFF | OFF | OFF | OFF | ON |
| T7 | ON | ON | ON | ON | OFF |

| | P11 | P12 | P13 | P14 | P15 |
|---|---|---|---|---|---|
| M1 | ON | ON | OFF | ON | ON |
| M2 | OFF | OFF | ON | OFF | OFF |
| M3 | OFF | OFF | ON | OFF | OFF |
| M5 | OFF | OFF | OFF | OFF | ON |
| M6 | ON | ON | ON | ON | OFF |
| M7 | OFF | ON | OFF | OFF | OFF |

DISPLAY DEVICE ENABLING BOTH HIGH-FREQUENCY DRIVE AND LOW-FREQUENCY DRIVE

TECHNICAL FIELD

The following disclosure relates to a display device, and more particularly to a display device provided with a pixel circuit including a display element driven by a current such as an organic electroluminescent (EL) element.

BACKGROUND ART

In recent years, an organic EL display device provided with a pixel circuit including an organic EL element has been put into practical use. The organic EL element is also called an organic light-emitting diode (OLED) and is a self-luminous display element that emits light with luminance corresponding to a current flowing therethrough. With the organic EL element being a self-luminous display element as described above, the organic EL display device can be easily reduced in thickness and power consumption and increased in luminance as compared to a liquid crystal display device that requires a backlight, a color filter, and the like.

Regarding the pixel circuit of the organic EL display device, a thin-film transistor (TFT) is typically employed as a drive transistor for controlling the supply of a current to the organic EL element. However, the thin-film transistor is prone to variations in its characteristics. Specifically, variations in threshold voltage are likely to occur. When variations in threshold voltage occur in drive transistors provided in a display unit, variations in luminance occur to cause deterioration in display quality. Therefore, various types of processing to compensate for variations in threshold voltage (compensation processing) have been proposed.

As the method of the compensation processing, the following methods are known: an internal compensation method in which compensation processing is performed by providing a capacitor in a pixel circuit to hold information on a threshold voltage of a drive transistor; and an external compensation method in which compensation processing is performed by, for example, measuring the magnitude of a current flowing through the drive transistor under a predetermined condition in a circuit provided outside the pixel circuit and correcting a video signal based on the measurement result.

As a pixel circuit of an organic EL display device employing the internal compensation method for compensation processing, for example, as illustrated in FIG. 28, a pixel circuit 90 including one organic EL element 91, seven transistors T91 to T97, and one holding capacitor C9 is known. The types of channels of the transistors T91 to T97 in the pixel circuit 90 are all p-type (p-channel type). In addition, typically, a thin-film transistor with a channel layer formed of low-temperature polysilicon (hereinafter referred to as an "LTPS-TFT") is employed for each of the transistors T91 to T97 in the pixel circuit 90. The LTPS-TFT has an advantage of high mobility, which enables high-speed drive, and an advantage of the ease of achieving a narrow panel frame.

At the time of charging the holding capacitor C9 in the pixel circuit 90 based on a data signal D(m), first, the gate voltage of the drive transistor (transistor T91) is initialized by turning on the transistor 194. Thereafter, the data signal D(m) is written to the holding capacitor C9 by turning on the transistors T92, T93. At that time, a current is supplied as indicated by an arrow denoted by reference numeral 92 in FIG. 29. That is, the holding capacitor C9 is charged via the drive transistor (transistor 194). In general, the current drive capability of the drive transistor is lowered so as to obtain high resolution, and hence it is difficult to shorten the charging time of the holding capacitor C9 even when the LTPS-TFT is employed for the drive transistor. If high-frequency drive (high-speed drive) in which the drive frequency is set to 120 Hz is employed, the display quality may deteriorate due to insufficient charge.

Therefore, for the pixel circuit, a configuration has been proposed in which a holding capacitor is provided between a node connected to a data signal line and a node connected to a control terminal (gate terminal) of a drive transistor so that the holding capacitor is charged not via the drive transistor (e.g., see Japanese Laid-Open Patent Publication No. 2014-139696).

In recent years, there has been an increasing demand for a reduction in power consumption for display devices. Therefore, a display device that performs low-frequency drive (low-speed drive) with a drive frequency of, for example, 1 Hz when there is no change in the display screen has been developed. In this regard, with a relatively large leakage current (off-leakage) being generated in the LTPS-TFT, when the pixel circuit 90 having the configuration illustrated in FIG. 28 is employed, the charging voltage of the holding capacitor C9 may change due to a leakage current when the low-frequency drive is performed. That is, there is a concern that the display quality deteriorates when the low-frequency drive is performed.

Therefore, U.S. Pat. No. 10,304,378 describes the use of a thin-film transistor in which a channel layer is formed of an oxide semiconductor (hereinafter referred to as an "oxide TFT") for some thin-film transistors in a pixel circuit to prevent the generation of a leakage current when low-frequency drive is performed. Oxide TFTs have an advantage of an extremely low leakage current (off leakage), and hence their use in thin-film transistors that make up the pixel and drive circuits of display devices has been increasing in recent years. The oxide semiconductor forming the channel layer of the oxide TFT is made of, for example, indium, gallium, zinc, and oxygen.

PRIOR ART DOCUMENT

Patent Documents

[Patent Document 1] Japanese Laid-Open Patent Publication No. 2014-139696
[Patent Document 2] U.S. Pat. No. 10,304,378

SUMMARY

Problems to be Solved by the Invention

Meanwhile, in recent years, a display device including a pixel circuit capable of operating at various frequencies between 1 to 120 Hz, for example, (i.e., a pixel circuit capable of adapting to both high-frequency drive and low-frequency drive) has been developed. With a configuration described in U.S. Pat. No. 10,304,378, it is possible to perform low-frequency drive without causing deterioration in display quality. However, similarly to the configuration illustrated in FIG. 28, the holding capacitor is charged via the drive transistor. Thus, when high-frequency drive is employed, the display quality may deteriorate due to insufficient charge.

Therefore, an object of the following disclosure is to achieve a display device including a pixel circuit that enables both high-frequency drive and low-frequency drive without causing deterioration in display quality.

Means for Solving the Problems

A display device according to some embodiments of the present disclosure is a display device provided with a pixel circuit including a display element driven by a current, the display device including a display unit that includes a plurality of the pixel circuits in a plurality of rows and a plurality of columns, a plurality of data signal lines configured to supply data signals to pixel circuits in respective columns, a plurality of scanning signal lines configured to control writing of the data signals into pixel circuits in respective rows, a plurality of emission control lines configured to control whether to supply a current to the display element included in the pixel circuits in the respective rows, a first power line configured to supply a high-level power supply voltage, a second power line configured to supply a low-level power supply voltage, and a reference power line configured to supply a reference voltage, wherein the pixel circuit includes a first control node, a second control node, the display element having a first terminal and having a second terminal connected to the second power line, a first initialization transistor having a control terminal connected to one of the plurality of scanning signal lines, a first conductive terminal connected to the first power line, and a second conductive terminal connected to the first control node, a threshold voltage compensation transistor having a control terminal connected to one of the plurality of scanning signal lines, a first conductive terminal connected to the first control node, and a second conductive terminal, a write control transistor having a control terminal connected to one of the plurality of scanning signal lines, a first conductive terminal connected to one of the plurality of data signal lines, and a second conductive terminal connected to the second control node, a drive transistor having a control terminal connected to the first control node, a first conductive terminal connected to the second conductive terminal of the threshold voltage compensation transistor, and the second conductive terminal connected to the first terminal of the display element, a first emission control transistor having a control terminal connected to one of the plurality of emission control lines, a first conductive terminal connected to the first power line, and a second conductive terminal connected to the first conductive terminal of the drive transistor, a second emission control transistor having a control terminal connected to one of the plurality of scanning signal lines, a first conductive terminal connected to the second control node, and a second conductive terminal connected to the first terminal of the display element, a second initialization transistor having a control terminal, a first conductive terminal connected to the first terminal of the display element, and a second conductive terminal connected to the reference power line, and a holding capacitor having a first electrode connected to the first control node and a second electrode connected to the second control node, and a channel layer of the first initialization transistor and a channel layer of the threshold voltage compensation transistor are each formed of an oxide semiconductor.

A display device according to some other embodiments of the present disclosure is a display device provided with a pixel circuit including a display element driven by a current, the display device including a display unit that includes a plurality of the pixel circuits in a plurality of rows and a plurality of columns, a plurality of data signal lines configured to supply data signals to pixel circuits in respective columns, a plurality of scanning signal lines configured to control writing of the data signals into pixel circuits in respective rows, a plurality of emission control lines configured to control whether to supply a current to the display element included in the pixel circuits in the respective rows, a first power line configured to supply a high-level power supply voltage, a second power line configured to supply a low-level power supply voltage, and a reference power line configured to supply a reference voltage, wherein the pixel circuit includes a first control node, a second control node, the display element having a first terminal and having a second terminal connected to the second power line, a first initialization transistor having a control terminal connected to one of the plurality of scanning signal lines, a first conductive terminal connected to the first power line, and a second conductive terminal connected to the first control node, a threshold voltage compensation transistor having a control terminal connected to one of the plurality of scanning signal lines, a first conductive terminal connected to the first control node, and a second conductive terminal, a write control transistor having a control terminal connected to one of the plurality of scanning signal lines, a first conductive terminal connected to one of the plurality of data signal lines, and a second conductive terminal connected to the second control node, a drive transistor having a control terminal connected to the first control node, a first conductive terminal connected to the second conductive terminal of the threshold voltage compensation transistor, and the second conductive terminal connected to the first terminal of the display element, a first emission control transistor having a control terminal connected to one of the plurality of emission control lines, a first conductive terminal connected to the first power line, and a second conductive terminal connected to the first conductive terminal of the drive transistor, a second emission control transistor having a control terminal connected to one of the plurality of scanning signal lines, a first conductive terminal connected to the second control node, and a second conductive terminal connected to the first terminal of the display element, a second initialization transistor having a control terminal, a first conductive terminal connected to the first terminal of the display element, and a second conductive terminal connected to the reference power line, and a holding capacitor having a first electrode connected to the first control node and a second electrode connected to the second control node.

A display device according to still some other embodiments of the present disclosure is a display device provided with a pixel circuit including a display element driven by a current, the display device including a display unit that includes a plurality of the pixel circuits in a plurality of rows and a plurality of columns, a plurality of data signal lines configured to supply data signals to pixel circuits in respective columns, a plurality of scanning signal lines configured to control writing of the data signals into pixel circuits in respective rows, a plurality of emission control lines configured to control whether to supply a current to the display element included in the pixel circuits in the respective rows, a first power line configured to supply a high-level power supply voltage, a second power line configured to supply a low-level power supply voltage, an initialization power line configured to supply an initialization voltage, and a reference power line configured to supply a reference voltage, wherein the pixel circuit includes a first control node, a second control node, the display element having a first terminal and having a second terminal connected to the second power line, a first initialization transistor having a control terminal connected to one of the plurality of scanning signal lines, a first conductive terminal connected to the reference power line, and a second conductive terminal connected to the second control node, a threshold voltage compensation transistor having a control terminal connected to one of the plurality of scanning signal lines, a first conductive terminal connected to the first control node, and a second conductive terminal, a write control transistor having a control terminal connected to one of the plurality of scanning signal lines, a first conductive terminal connected to one of the plurality of data signal lines, and a second conductive terminal connected to the second control node, a drive transistor having a control terminal connected to the first control node, a first conductive terminal connected to the first power line, and a second conductive terminal connected to the second conductive terminal of the threshold voltage compensation transistor, a first emission control transistor having a control terminal connected to one of the plurality of emission control lines, a first conductive terminal connected to the second conductive terminal of the drive transistor, and a second conductive terminal connected to the first terminal of the display element, a second emission control transistor having a control terminal connected to one of the plurality of emission control lines, a first conductive terminal connected to the first terminal of the display element, and a second conductive terminal connected to the initialization power line, a second initialization transistor having a control terminal connected to one of the plurality of scanning signal lines, a first conductive terminal connected to the first control node, and a second conductive terminal connected to the initialization power line, and a holding capacitor having a first electrode connected to the first control node and a second electrode connected to the second control node, and a channel layer of the threshold voltage compensation transistor and a channel layer of the second initialization transistor are each formed of an oxide semiconductor.

Effects of the Invention

According to some embodiments of the present disclosure, with regard to the configuration of the pixel circuit, the holding capacitor is provided between the second control node connected to the data signal line via the write control transistor and the first control node connected to the control terminal of the drive transistor. With such a configuration, the holding capacitor is charged not via the drive transistor. That is, the holding capacitor is charged quickly. Since it is sufficient that the voltage of the data signal is determined by the time when the threshold voltage compensation transistor changes from the on-state to the off-state, the display quality does not deteriorate unless a large delay occurs in the waveform change of the data signal. From the above, even when high-frequency drive (high-speed drive) with a drive frequency of 120 Hz, for example, is performed, favorable display quality is maintained. In addition, regarding each of the transistors having the conductive terminal connected to the first control node (the first initialization transistor having the second conductive terminal connected to the first control node, and the threshold voltage compensation transistor having the first conductive terminal connected to the first control node), the channel layer is formed of an oxide semiconductor. Hence the generation of a leakage current in these transistors is prevented. Thus, even when low-frequency drive (low-speed drive) with a drive frequency of 1 Hz, for example, is performed, the display quality is not deteriorated due to the leakage current. That is, favorable display quality is maintained. From the above, a display device including a pixel circuit that enables both high-frequency drive and low-frequency drive without causing deterioration in display quality is achieved.

MODES FOR CARRYING OUT THE INVENTION

Embodiments will be described below with reference to the accompanying drawings. In the following description, it is assumed that i and j are integers of 2 or more, m is an integer of 1 or more and i or less, and n is an integer of 1 or more and j or less. In addition, the voltage of each node or the like represents a potential difference from a reference potential when 0 V is set as the reference potential.

1. First Embodiment

<1.1 Overall Configuration>

Figure 2:
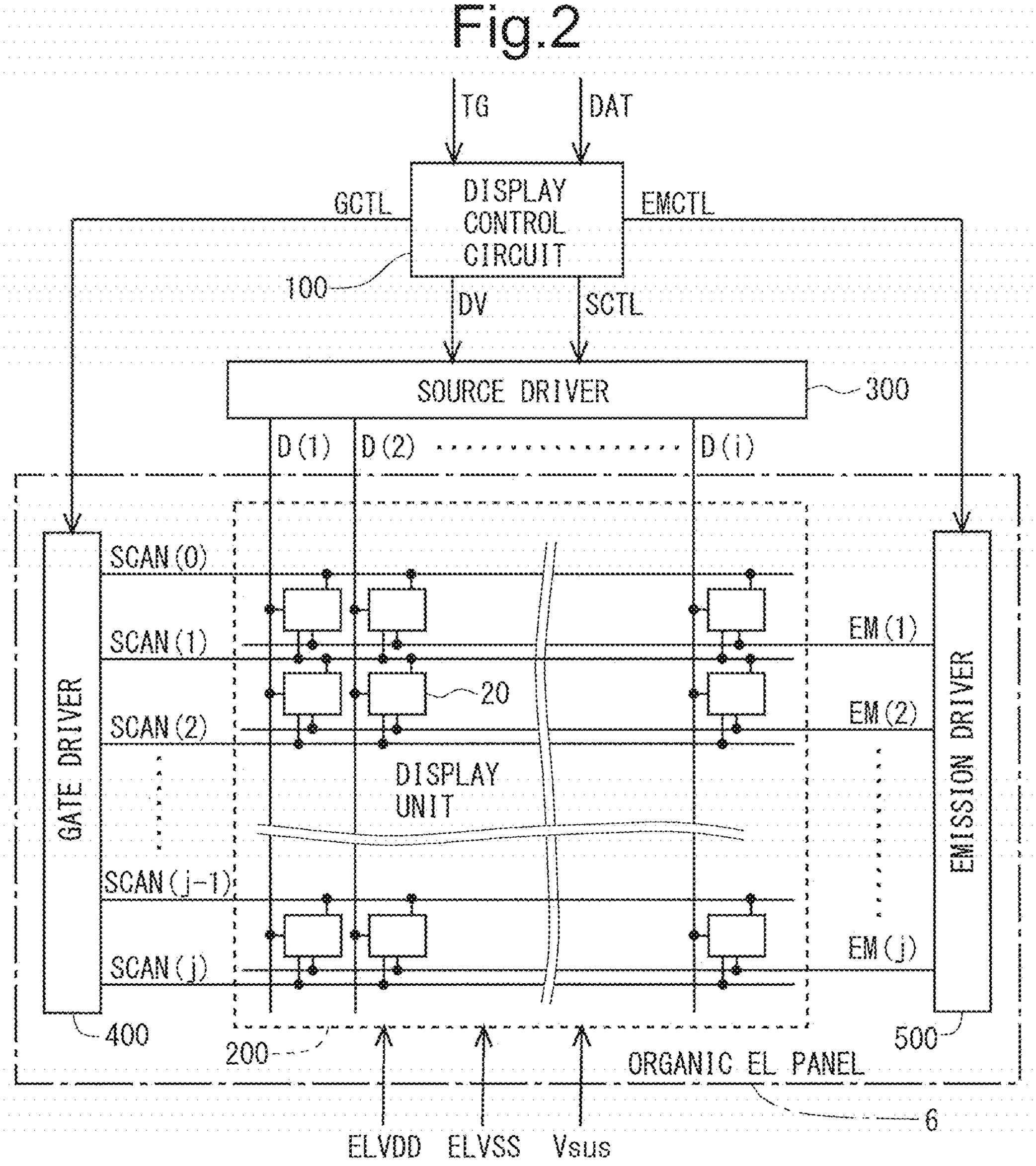
FIG. 2 is a block diagram illustrating an overall configuration of an organic EL display device according to the first embodiment.

FIG. 2 is a block diagram illustrating an overall configuration of an organic EL display device according to a first embodiment. As illustrated in FIG. 2, the organic EL display device includes a display control circuit 100, a display unit 200, a source driver (data signal line drive circuit) 300, a gate driver (scanning signal line drive circuit) 400, and an emission driver (emission control line drive circuit) 500. In the present embodiment, the gate driver 400 and the emission driver 500 are formed in an organic EL panel 6 including the display unit 200. That is, the gate driver 400 and the emission driver 500 are monolithic. However, it is also possible to employ a configuration in which the gate driver 400 and the emission driver 500 are not monolithic.

In the display unit 200, i data signal lines D(1) to D(i) and (j+1) scanning signal lines SCAN(0) to SCAN(j) orthogonal thereto are disposed. Further, in the display unit 200, j emission control lines EM(1) to EM(j) are disposed to correspond one-to-one to the j scanning signal lines SCAN (1) to SCAN(j) except for the scanning signal line SCAN(0). The scanning signal lines SCAN(0) to SCAN(j) and the emission control lines EM(1) to EM(j) are parallel to each other. Furthermore, in the display unit 200, i×j pixel circuits 20 are provided to correspond to the intersections of the i data signal lines D(1) to D(i) and the j scanning signal lines SCAN(1) to SCAN(j). By providing the i×j pixel circuits 20 in this manner, a pixel matrix of i columns and j rows is formed in the display unit 200. In the following, reference numerals SCAN(0) to SCAN(j) may also be attached to scanning signals respectively provided to the (j+1) scanning signal lines SCAN(0) to SCAN(j), reference numerals EM(1) to EM(j) may also be attached to emission control signals respectively provided to the j emission control lines EM(1) to EM(j), and reference numerals D(1) to D(i) may also be attached to data signals respectively provided to the i data signal lines D(1) to D(i).

In the display unit 200, power lines (not illustrated) common to all the pixel circuits 20 are disposed. More specifically, a power line that supplies a high-level power supply voltage ELVDD for driving the organic EL element (hereinafter referred to as a "high-level power line"), a power line that supplies a low-level power supply voltage ELVSS for driving the organic EL element (hereinafter referred to as a "low-level power line"), and a power line that supplies a reference voltage Vsus (hereinafter referred to as an "reference power line") are disposed. The high-level power supply voltage ELVDD, the low-level power supply voltage ELVSS, and the reference voltage Vsus are supplied from a power supply circuit (not illustrated). In the present embodiment, a first power line is achieved by the high-level power line, and a second power line is achieved by the low-level power line.

Hereinafter, the operation of each component illustrated in FIG. 2 will be described. The display control circuit 100 receives an image data DAT and a timing signal group (horizontal synchronization signal, vertical synchronization signal, etc.) TG, transmitted from the outside, and outputs a digital video signal DV, a source control signal SCTL for controlling the operation of the source driver 300, a gate control signal GCTL for controlling the operation of the gate driver 400, and an emission driver control signal EMCTL for controlling the operation of the emission driver 500. The source control signal SCTL includes a source start pulse signal, a source clock signal, a latch strobe signal, and the like. The gate control signal GCTL includes a gate start pulse signal, a gate clock signal, and the like. The emission driver control signal EMCTL includes an emission start pulse signal, an emission clock signal, and the like.

The source driver 300 is connected to the i data signal lines D(1) to D(i). The source driver 300 receives the digital video signal DV and the source control signal SCTL which are outputted from the display control circuit 100 and applies data signals to the i data signal lines D(1) to D(i). The source driver 300 includes an i-bit shift register, a sampling circuit, a latch circuit, i D/A converters, and the like (not illustrated). The shift register has i registers that are cascade-connected. On the basis of the source clock signal, the shift register sequentially transfers the pulse of the source start pulse signal supplied to the first-stage register from the input terminal to the output terminal. A sampling pulse is outputted from each stage of the shift register in accordance with the transfer of the pulse. On the basis of the sampling pulse, the sampling circuit stores the digital video signal DV. The latch circuit captures and holds the digital video signal DV for one row stored in the sampling circuit in accordance with the latch strobe signal. The D/A converter is provided to correspond to each of the data signal lines D(1) to D(i). The D/A converter converts the digital video signal DV held in the latch circuit into an analog voltage. The converted analog voltages are simultaneously applied to all the data signal lines D(1) to D(i) as data signals.

The gate driver 400 is connected to the (j+1) scanning signal lines SCAN(0) to SCAN(j). The gate driver 400 includes a shift register, a logic circuit, and the like. On the basis of the gate control signal GCTL outputted from the display control circuit 100, the gate driver 400 drives the (j+1) scanning signal lines SCAN(0) to SCAN(j).

The emission driver 500 is connected to the j emission control lines EM(1) to EM(j). The emission driver 500 includes a shift register, a logic circuit, and the like. On the basis of the emission driver control signal EMCTL outputted from the display control circuit 100, the emission driver 500 drives the j emission control lines EM(1) to EM(j).

The i data signal lines D(1) to D(i), the (j+1) scanning signal lines SCAN(0) to SCAN(j), and the j emission control lines EM(1) to EM(j) are driven as described above, whereby an image based on the image data DAT is displayed on the display unit 200.

<1.2 Configuration of Pixel Circuit>

Figure 1:
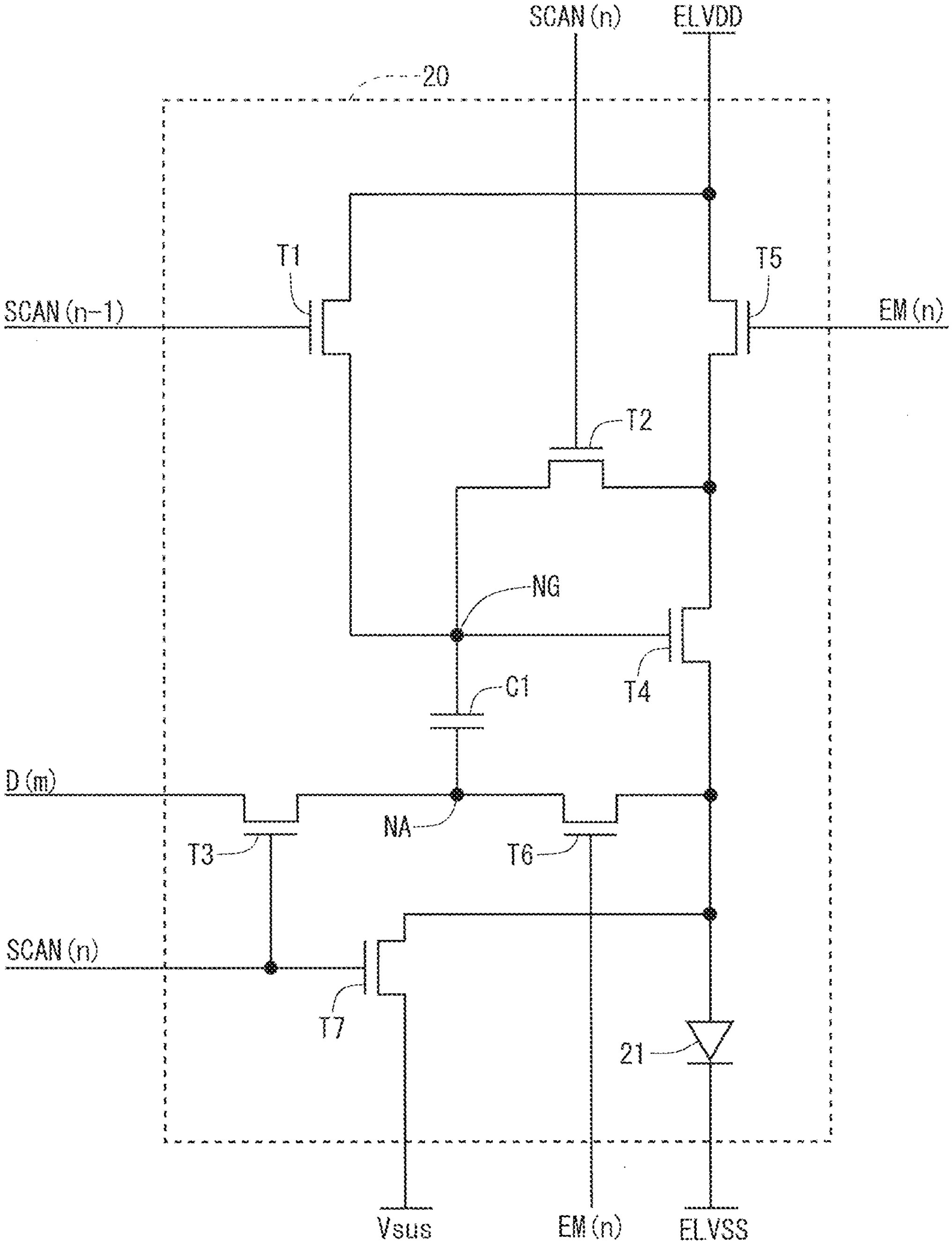
FIG. 1 is a circuit diagram illustrating a configuration of a pixel circuit in an nth row and an mth column in a first embodiment.

Next, the configuration of the pixel circuit 20 in the display unit 200 will be described. FIG. 1 is a circuit diagram illustrating a configuration of a pixel circuit 20 in an nth row and an mth column. The pixel circuit 20 includes one organic EL element (organic light-emitting diode) 21 as a display element (a display element driven by a current), seven transistors (typically thin-film transistors) T1 to T7 (first initialization transistor T1, threshold voltage compensation transistor T2, write control transistor T3, drive transistor T4, first emission control transistor T5, second emission control transistor T6, second initialization transistor T7), and one holding capacitor C1. The holding capacitor C1 is a capacitive element made up of two electrodes (first and second electrodes). The transistors T1 to T7 are n-channel transistors.

With regard to the configuration illustrated in FIG. 1, a node connected to the second conductive terminal of the first initialization transistor T1, the first conductive terminal of the threshold voltage compensation transistor T2, the control terminal of the drive transistor T4, and the first electrode of the holding capacitor C1 is referred to as a "first control node". The first control node is denoted by reference numeral NG. A node connected to the second conductive terminal of the write control transistor T3, the first conductive terminal of the second emission control transistor T6, and the second electrode of the holding capacitor C1 is referred to as a "second control node". The second control node is denoted by reference numeral NA.

The first initialization transistor T1 has a control terminal connected to the scanning signal line SCAN(n−1) in the (n−1)th row, a first conductive terminal connected to the high-level power line and the first conductive terminal of the first emission control transistor T5, and a second conductive terminal connected to the first control node NG. The threshold voltage compensation transistor T2 has a control terminal connected to the scanning signal line SCAN(n) in the nth row, a first conductive terminal connected to the first control node NG, and a second conductive terminal connected to the first conductive terminal of the drive transistor T4 and the second conductive terminal of the first emission control transistor T5. The write control transistor T3 has a control terminal connected to the scanning signal line SCAN(n) in the nth row, a first conductive terminal connected to the data signal line D(m) in the mth column, and a second conductive terminal connected to the second control node NA. The drive transistor T4 has a control terminal connected to the first control node NG, a first conductive terminal connected to the second conductive terminal of the threshold voltage compensation transistor T2 and the second conductive terminal of the first emission control transistor T5, and a second conductive terminal connected to the second conductive terminal of the second emission control transistor T6, the first conductive terminal of the second initialization transistor T7, and the anode terminal (first terminal) of the organic EL element 21.

The first emission control transistor T5 has a control terminal connected to the emission control line EM(n) in the nth row, a first conductive terminal connected to the high-level power line and the first conductive terminal of the first initialization transistor T1, and a second conductive terminal connected to the second conductive terminal of the threshold voltage compensation transistor T2 and the first conductive terminal of the drive transistor T4. The second emission control transistor T6 has a control terminal connected to the emission control line EM(n) in the nth row, a first conductive terminal connected to the second control node NA, and a second conductive terminal connected to the second conductive terminal of the drive transistor T4, the first conductive terminal of the second initialization transistor T7, and the anode terminal of the organic EL element 21. The second initialization transistor T7 has a control terminal connected to the scanning signal line SCAN(n) in the nth row, a first conductive terminal connected to the second conductive terminal of the drive transistor T4, the second conductive terminal of the second emission control transistor T6, and the anode terminal of the organic EL element 21, and a second conductive terminal connected to the reference power line. The holding capacitor C1 has a first electrode connected to the first control node NG and a second electrode connected to the second control node NA. The organic EL element 21 has an anode terminal connected to the second conductive terminal of the drive transistor T4, the second conductive terminal of the second emission control transistor T6, and the first conductive terminal of the second initialization transistor T7, and has a cathode terminal (second terminal) connected to the low-level power line.

In the present embodiment, an oxide TFT is employed for each of the first initialization transistor T1, the threshold voltage compensation transistor T2, and the second initialization transistor T7, and an LTPS-TFT is employed for each of the write control transistor T3, the drive transistor T4, the first emission control transistor T5, and the second emission control transistor T6.

Note that the oxide semiconductor forming the channel layer of the oxide TFT is made of indium, gallium, zinc, and oxygen in the present embodiment. However, it is not limited thereto.

<1.3 Drive Method (Operation of Pixel Circuit)>

Figures 3, 4:
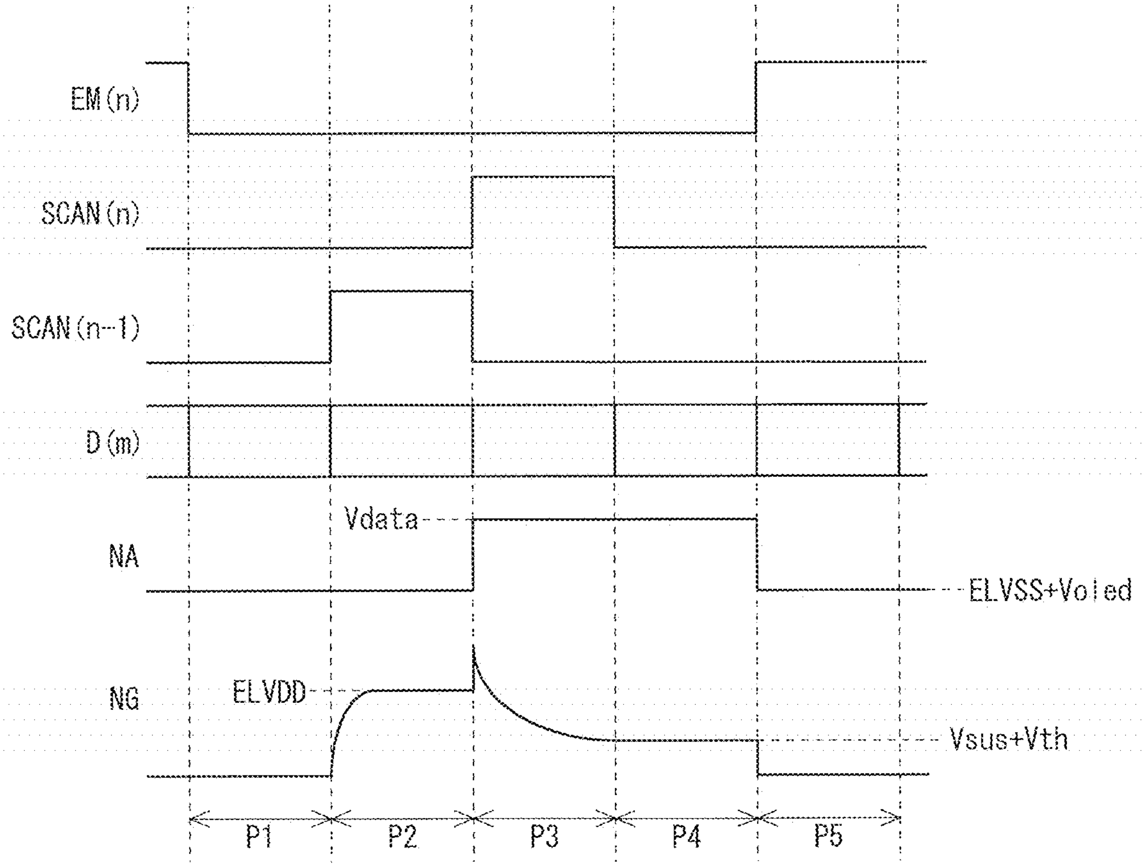
FIG. 3 is a waveform diagram for explaining the operation of the pixel circuit in the first embodiment.
FIG. 4 is a diagram illustrating a transition of a state of each transistor in the pixel circuit in the first embodiment.

Next, the operation of the pixel circuit 20 illustrated in FIG. 1 will be described with reference to FIG. 3. A period before period P1 and a period after period P5 are emission periods for the organic EL element 21 in this pixel circuit 20. Regarding the emission control signal EM and the scanning signal SCAN, a high level corresponds to an on-level, and a low level corresponds to an off-level. The changes in the voltages of the second control node NA and the first control node NG depend on the data signal D(m), and hence each of the voltage waveforms of the second control node NA and the first control node NG illustrated in FIG. 3 is an example. FIG. 4 illustrates the transition of the state (on/off-state) of each transistor (however, the drive transistor T4 is excluded) in the periods P1 to P5 in FIG. 3.

In the period before period P1, the emission control signal EM(n) is at the high level, and the scanning signals SCAN (n) and SCAN(n−1) are at the low level. At this time, the first emission control transistor T5 and the second emission control transistor T6 are in the on-state. With the second emission control transistor T6 being in the on-state, the voltage between the control terminal and the second conductive terminal of the drive transistor T4 is equal to the charging voltage of the holding capacitor C1. In addition, with the first emission control transistor T5 being in the on-state, the drive current is supplied to the organic EL element 21 in accordance with the magnitude of the charging voltage of the holding capacitor C1. Thus, the organic EL element 21 emits light in accordance with the magnitude of the drive current.

When period P1 is reached, an emission control signal EM(n) changes from the high level to the low level. Thereby, the first emission control transistor T5 and the second emission control transistor T6 are turned off. As a result, the supply of the drive current to the organic EL element 21 is cut off, and the organic EL element 21 is interrupted.

Figure 5:
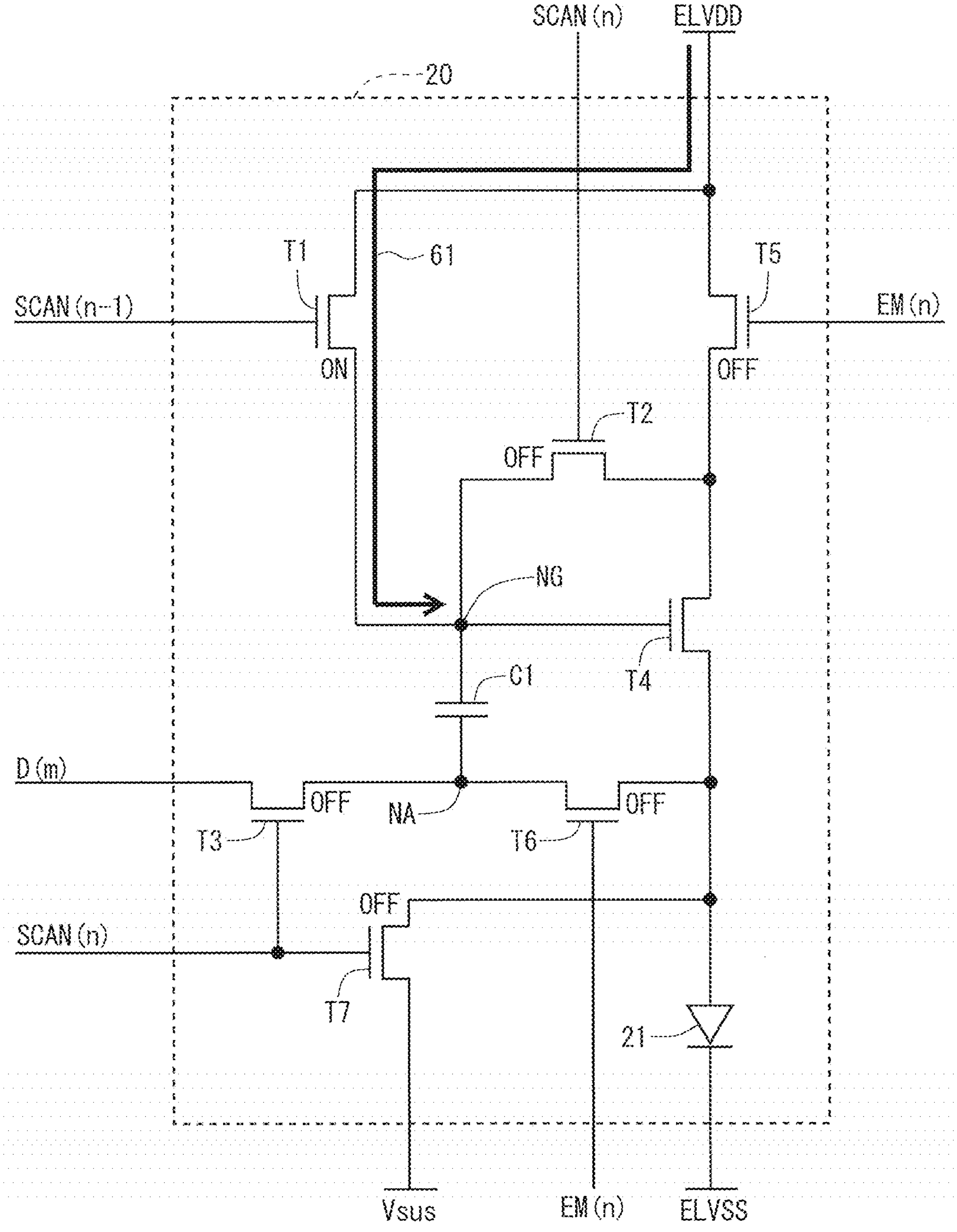
FIG. 5 is a diagram for explaining the operation of the pixel circuit in the first embodiment.

When period P2 is reached, the scanning signal SCAN (n−1) changes from the low level to the high level. Thereby, the first initialization transistor T1 is turned on, and a current is supplied to the first control node NG as indicated by an arrow denoted by reference numeral 61 in FIG. 5. As a result, the holding capacitor C1 is charged, and the voltage of the first control node NG increases. This makes the voltage of the first control node NG equal to the high-level power supply voltage ELVDD. As above, in period P2, the voltage of the first control node NG (i.e., the gate voltage of the drive transistor T4) is initialized.

Figure 6:
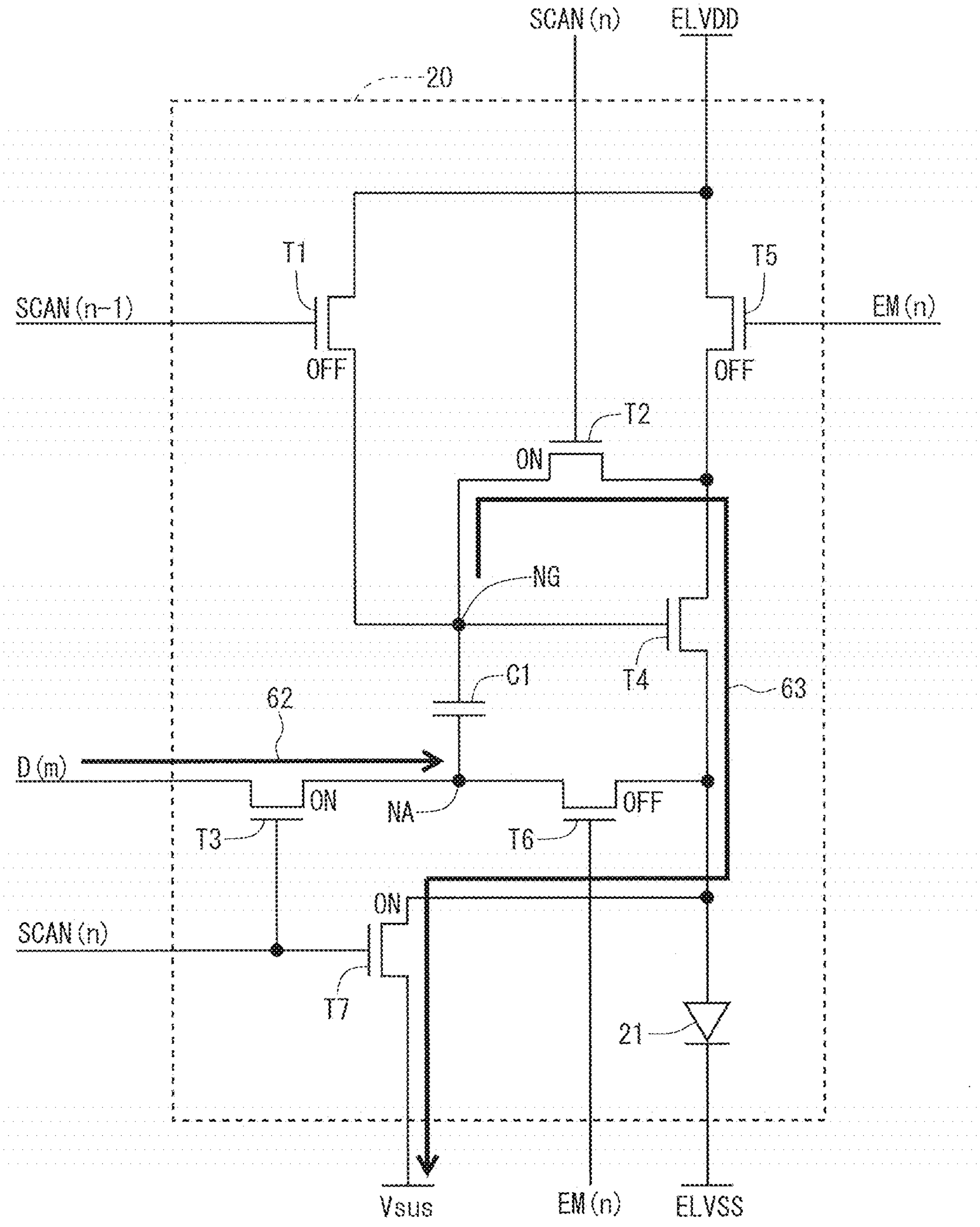
FIG. 6 is a diagram for explaining the operation of the pixel circuit in the first embodiment.

When period P3 is reached, the scanning signal SCAN (n−1) changes from the high level to the low level. Thereby, the first initialization transistor T1 is turned off, and the initialization of the voltage of the first control node NG ends. In addition, when period P3 is reached, the scanning signal SCAN(n) changes from the low level to the high level. Thereby, the threshold voltage compensation transistor T2, the write control transistor T3, and the second initialization transistor T7 are turned on. By the write control transistor T3 being turned on, the data signal D(m) is provided to the second control node NA via the write control transistor T3 as indicated by an arrow denoted by reference numeral 62 in FIG. 6. Thus, the voltage of the second control node NA changes in accordance with the data signal D(m). At this time, the voltage of the second control node NA may increase, may decrease, or may be maintained. Meanwhile, a holding capacitor C1 is provided between the second control node NA and the first control node NG. Hence the voltage of the first control node NG also changes in accordance with the change in the voltage of the second control node NA. In addition, by the threshold voltage compensation transistor T2 and the second initialization transistor T7 being turned on, a current flows from the first control node NG to the reference power line as indicated by an arrow denoted by reference numeral 63 in FIG. 6. Thus, the voltage of the first control node NG decreases gradually. Then, when the voltage between the control terminal and the second conductive terminal of the drive transistor 14 becomes equal to the threshold voltage of the drive transistor T4, the current does not flow between the first conductive terminal and the second conductive terminal of the drive transistor T4, and the decrease in the voltage of the first control node NG stops. Specifically, the voltage of the first control node NG decreases until becoming equal to the sum of the reference voltage Vsus and a threshold voltage Vth of the drive transistor T4. At this time, the anode voltage of the organic EL element 21 is equal to the reference voltage Vsus. That is, in period P3, the anode voltage of the organic EL element 21 is initialized based on the reference voltage Vsus.

When period P4 is reached, the scanning signal SCAN(n) changes from the high level to the low level. Thereby, the threshold voltage compensation transistor T2, the write control transistor T3, and the second initialization transistor T7 are turned off. In period P4, the voltages of the first control node NG and the second control node NA are maintained at the voltage at the end of period P3.

Figure 7:
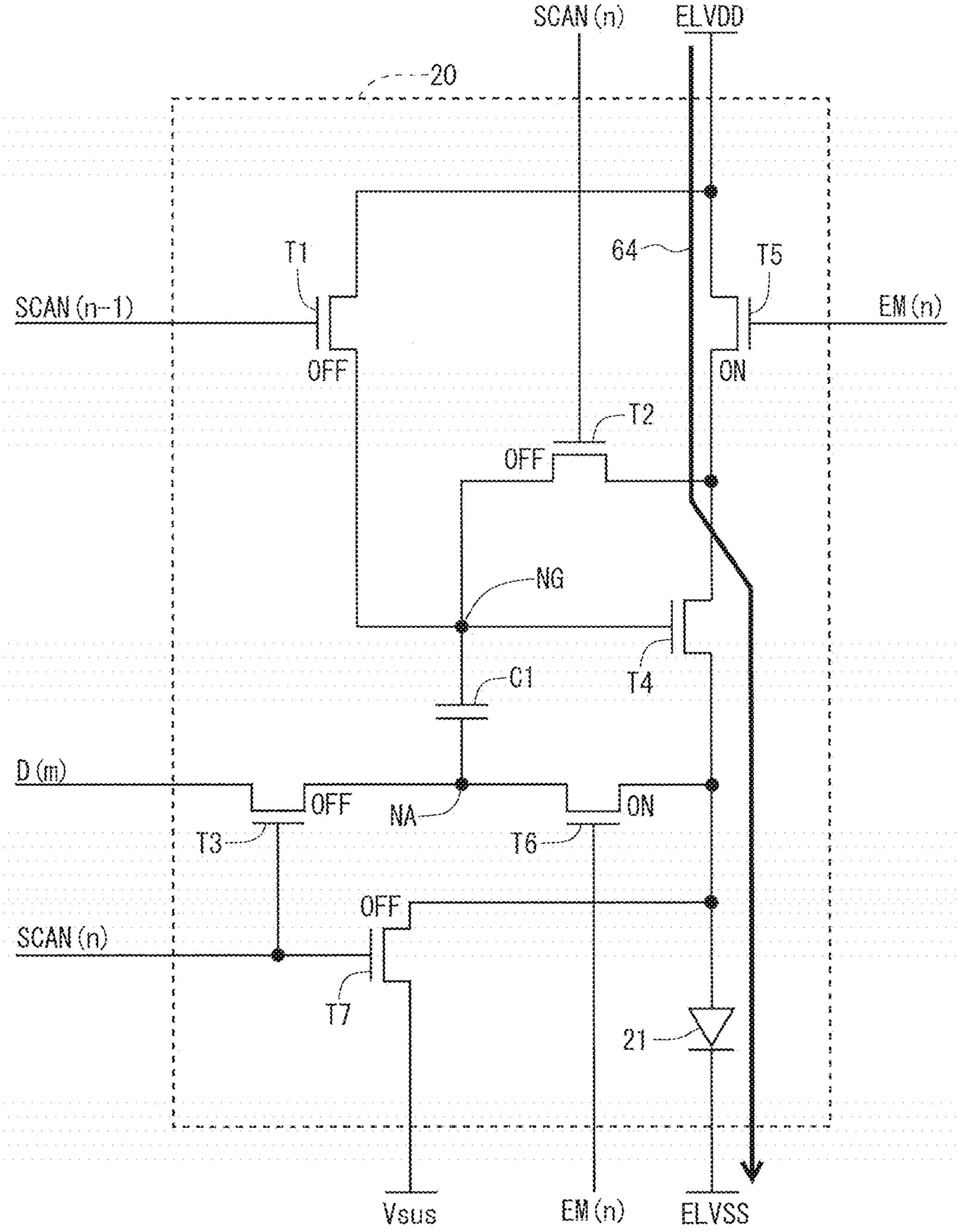
FIG. 7 is a diagram for explaining the operation of the pixel circuit in the first embodiment.

When period P5 is reached, an emission control signal EM(n) changes from the low level to the high level. Thereby, the second emission control transistor T6 is turned on, and the second conductive terminal of the drive transistor T4 and the second control node NA are connected electrically. That is, the voltage of the second conductive terminal of the drive transistor T4 becomes equal to the voltage of the second control node NA. In addition, in period P5, the first emission control transistor T5 is turned on. From the above, in accordance with the magnitude of the voltage between the control terminal and the second conductive terminal of the drive transistor T4 (the charging voltage of the holding capacitor C1), the drive current is supplied to the organic EL element 21 as indicated by an arrow denoted by reference numeral 64 in FIG. 7. As a result, the organic EL element 21 emits light in accordance with the magnitude of the drive current. Note that the anode voltage of the organic EL element 21 changes in accordance with the magnitude of the drive current, and the voltage of the second control node NA changes so as to be equal to the anode voltage of the organic EL element 21. Then, the voltage of the first control node NG also changes in accordance with the change in the voltage of the second control node NA.

Thereafter, the state in which the organic EL element 21 emits light in accordance with the magnitude of the drive current is continued throughout the period until the emission control signal EM(n) changes from the high level to the low level.

Here, specific examples of voltage settings and voltage changes will be described. For example, the high-level power supply voltage ELVDD is set to 11.5 V, the low-level power supply voltage ELVSS and the reference voltage Vsus are set to 2.5 V, the high-level side voltages of the scanning signal SCAN and the emission control signal EM are set to 14.5 V, and the low-level side voltages of the scanning signal SCAN and the emission control signal EM are set to −3.5 V. The voltage of the data signal D is set within a range of 1 V to 6 V. In this regard, the voltage corresponding to white is 1 V, and the voltage corresponding to black is 6 V. It is assumed that the threshold voltage of the drive transistor T4 is 4 V. Further, it is assumed that the voltage Voled between the anode and the cathode of the organic EL element 21 during the emission period is 4 V when the voltage of the data signal D is a voltage (1 V) corresponding to white, and it is assumed that the voltage Voled between the anode and the cathode of the organic EL element 21 during the emission period is 0 V when the voltage of the data signal D is a voltage (6 V) corresponding to black.

First, a case where the voltage of the data signal D is a voltage (1 V) corresponding to white will be described. At the end of period P2, the voltage of the first control node NG is 11.5 V regardless of the voltage of the data signal D.

In period P3, the voltage of the second control node NA becomes 1 V. Further, as described above, the voltage of the first control node NG decreases until becoming equal to the sum of the reference voltage Vsus and the threshold voltage Vth of the drive transistor 14. Thus, at the end of period P3, the voltage of the first control node NG is 6.5 V. As described above, in period P4, the voltages of the first control node NG and the second control node NA are maintained at the voltage at the end of period P3. From the above, at the end of period P4, the voltage of the second control node NA is 1 V, and the voltage of the first control node NG is 6.5 V.

In period P5, the voltage of the second control node NA becomes equal to the sum of the low-level power supply voltage ELVSS and the voltage Voled between the anode and the cathode of the organic EL element 21. That is, the voltage VNA of the second control node NA in period P5 is expressed by Expression (1) below.

$$VNA=ELVSS+Voled \quad (1)$$

Thus, in period P5, the voltage VNA of the second control node NA is 6.5 V.

When the voltage of the data signal D is represented by Vdata, a change ΔVNA of the voltage of the second control node NA from period P4 to period P5 is expressed by Expression (2) below.

$$\Delta VNA=ELVSS+Voled-V\mathrm{data} \quad (2)$$

In this example, the change ΔVNA in the voltage of the second control node NA is 5.5 V.

As described above, in period P5, the voltage of the first control node NG also changes in accordance with the change in the voltage of the second control node NA. The voltage of the first control node NG at the end of period P4 is equal to the sum of the reference voltage Vsus and the threshold voltage Vth of the drive transistor T4, and hence a voltage VNG of the first control node NG in period P5 is expressed by Expression (3) below. Note that k is a ratio of the capacitance value of the holding capacitor C1 to the capacitance value of the entire capacitance formed by the second control node NA, and here, it is assumed that "k=1" holds.

$$VNG=Vsus+Vth+k\Delta VNA \quad (3)$$

From the above, in period P5, the voltage VNG of the first control node NG is 12 V.

A voltage Vgs between the first conductive terminal and the second conductive terminal of the drive transistor 14 in period P5 is expressed by Expression (4) below.

$$\begin{aligned} Vgs &= VNG - VNA \\ &= Vsus + Vth + k\Delta VNA - (ELVSS + Voled) \\ &= Vsus + Vth + ELVSS + Voled - Vdata - (ELVSS + Voled) \\ &= Vsus + Vth - Vdata \end{aligned} \quad (4)$$

In this example, the voltage Vgs between the first conductive terminal and the second conductive terminal of the drive transistor T4 is 5.5 V.

A current Ioled flowing through the organic EL element 21 in the period after period P5 is expressed by Expression (5) below when "Vgs≥Vth" holds, and is expressed by Expression (6) below when "Vgs<Vth" holds.

[Mathematical Expression 1]

$$\begin{aligned} Ioled &= \beta(Vgs - Vth)^2/2 \\ &= \beta(Vsus + Vth - Vdata - Vth)^2/2 \\ &= \beta(Vsus - Vdata)^2/2 \end{aligned} \quad (5)$$

However, β=(W/L)×μ×Cox

W: channel width of the drive transistor

L: channel length of the drive transistor

μ: mobility of the drive transistor

Cox: gate insulating film capacitance of the drive transistor

[Mathematical Expression 2]

$$Ioled=(qAD_n n_i e q^{\psi_B/kT}/L)(1-e^{-qV_D/kT})e^{q\psi_s/kT} \quad (6)$$

A: cross-section area of the channel of the drive transistor $D_n$: diffusion coefficient $n_i$: intrinsic carrier density q: elementary charge k: Boltzmann constant T: temperature $V_D$: voltage of the first conductive terminal of the drive transistor L: channel length of the drive transistor $\psi_B$: difference between Fermi level of the substrate and intrinsic Fermi level $\psi_s$: surface potential With regard to the time when "Vgs<Vth" holds, the surface potential can be approximated by "VNG−Vth", and thus Ioled is proportional to exp(q(VNG−Vth)/kT). That is, when "Vgs<Vth" holds, Ioled decreases exponentially as VNG decreases.

Next, a case where the voltage of the data signal D is a voltage (6 V) corresponding to black will be described. As described above, at the end of period P2, the voltage of the first control node NG is 11.5 V regardless of the voltage of the data signal D.

In period P3, the voltage of the second control node NA is 6 V. In addition, as described above, the voltage of the first control node NG is 6.5 V at the end of period P3, and the voltages of the first control node NG and the second control node NA are maintained at the voltage at the end of period P3, in period P4. From the above, at the end of period P4, the voltage of the second control node NA is 6 V, and the voltage of the first control node NG is 6.5 V.

In period P5, the voltage VNA of the second control node NA is 2.5 V according to Expression (1) above. A change ΔVNA in the voltage of the second control node NA from period P4 to period P5 is −3.5 V according to Expression (2) above. In period P5, the voltage VNG of the first control node NG is 3 V according to Expression (3) above. The voltage Vgs between the first conductive terminal and the second conductive terminal of the drive transistor T4 in period P5 is 0.5 V according to Expression (4) above.

The current Ioled flowing through the organic EL element 21 in the period after period P5 is expressed by the same Expression as in the case where the voltage of the data signal D is the voltage (1 V) corresponding to white (cf. Expressions (5) and (6) above).

<1.4 Comparison with Known Example>

Figure 8:
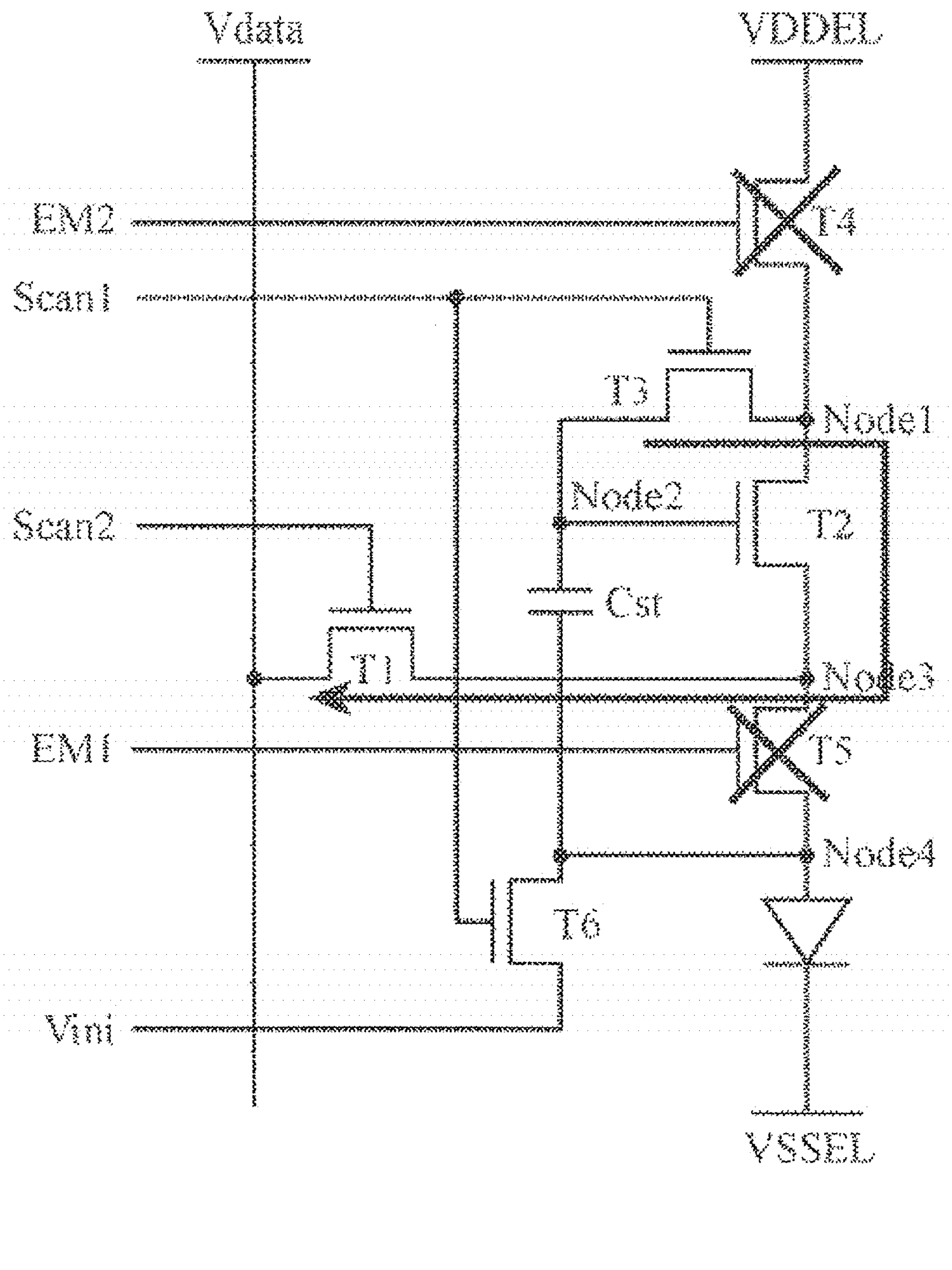
FIG. 8 is FIG. 6C of U.S. Pat. No. 10,304,378.
Figure 9:
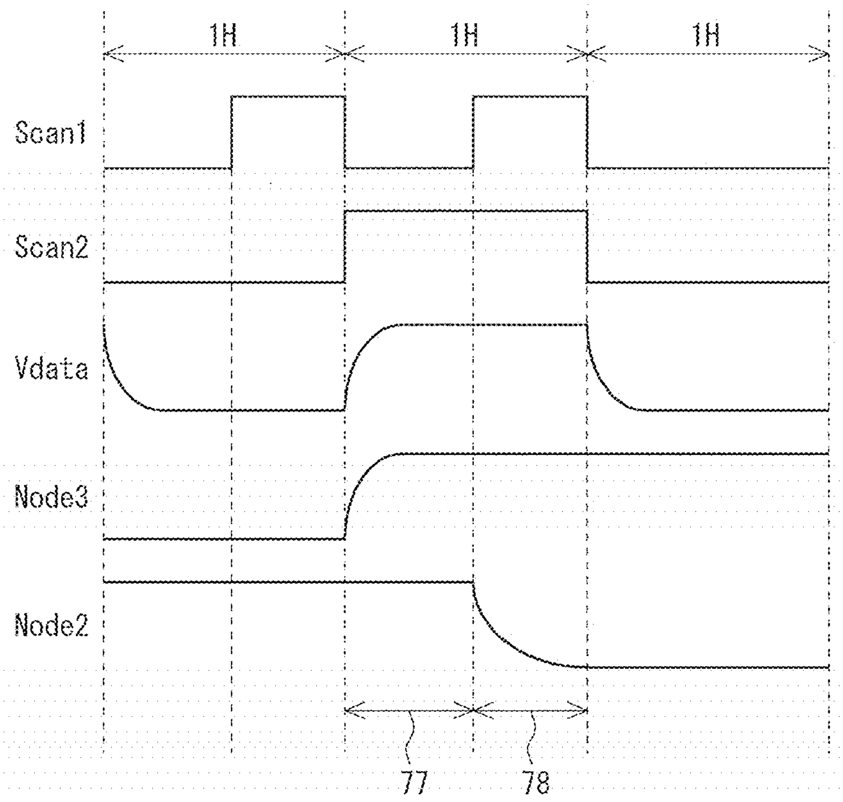
FIG. 9 is a waveform diagram for explaining an operation of a pixel circuit described in U.S. Pat. No. 10,304,378.
Figure 10:
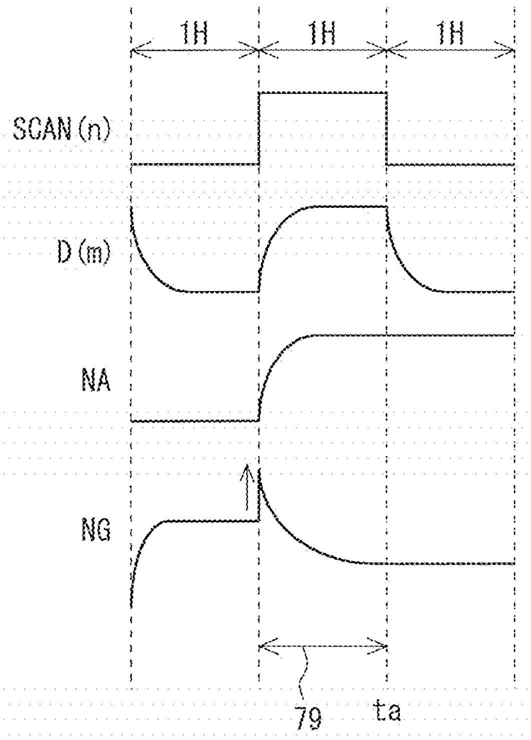
FIG. 10 is a waveform diagram for explaining an effect of the present embodiment.

According to the configuration described in U.S. Pat. No. 10,304,378 (cf. FIG. 8), for example, in a period indicated by an arrow denoted by reference numeral 78 in FIG. 9, the charge (writing) of a voltage corresponding to a data signal Vdata to a holding capacitor Cst and compensation processing for compensating for variations in the threshold voltage of the drive transistor are performed. However, at the start of the compensation processing, the voltage of Node3 needs to be set to the voltage of the data signal Vdata. Therefore, a period (period represented by an arrow denoted by reference numeral 77 in FIG. 9) for setting the voltage of Node3 to the voltage of the data signal Vdata by setting a signal Scan1 to the low level and a signal Scan2 to the high level is necessary. From the above, the period from the time point at which the voltage of the data signal Vdata starts changing to the time point at which the compensation processing ends (the time point at which the voltage of Node2 becomes a magnitude corresponding to the threshold voltage of the drive transistor) is relatively long. In contrast, according to the present embodiment, the current path for writing the data signal D and the current path for the compensation processing are completely different paths as can be grasped from FIG. 6, so that the operation of the compensation processing can be started at the time when the voltage of the data signal D starts changing. That is, as in a period indicated by an arrow denoted by reference numeral 79 in FIG. 10, the period from the time point at which the voltage of the data signal D starts changing to the time point at which the compensation processing ends (the time point at which the voltage of the first control node NG becomes a magnitude corresponding to the threshold voltage of the drive transistor) is relatively short. As above, according to the configuration described in U.S. Pat. No. 10,304,378, as compared to the configuration according to the present embodiment, the length of one horizontal period (1H) is longer by at least the period represented by the arrow denoted by reference numeral 77 in FIG. 9. In other words, according to the present embodiment, it is possible to shorten the length of one horizontal period (1H) and to thereby perform the drive at a higher speed than before.

<1.5 Effects>

According to the present embodiment, with regard to the configuration of the pixel circuit 20, the holding capacitor C1 is provided between the second control node NA connected to the data signal line D via the write control transistor T3 and the first control node NG connected to the control terminal of the drive transistor T4. With such a configuration, the holding capacitor C1 is charged not via the drive transistor T4. That is, the holding capacitor C1 is charged quickly. In addition, it is sufficient that the voltage of the data signal D is determined by the time when the threshold voltage compensation transistor T2 changes from the on-state to the off-state (time point to in FIG. 10), the display quality does not deteriorate unless a large delay occurs in the waveform change of the data signal D. Furthermore, with the LIPS-TFT being employed for the drive transistor T4, the first control node NG is quickly charged in period P3 (cf. FIG. 3) in which the compensation processing for compensating the threshold voltage of the drive transistor T4 is performed. From the above, even when high-frequency drive (high-speed drive) with a drive frequency of 120 Hz, for example, is performed, favorable display quality is maintained. Moreover, an oxide TFT is employed for each of the transistors having the conductive terminal connected to the first control node NG (specifically, the first initialization transistor T1 having the second conductive terminal connected to the first control node NG, and the threshold voltage compensation transistor T2 having the first conductive terminal connected to the first control node NG). Hence the generation of a leakage current in these transistors is prevented. Thus, even when low-frequency drive (low-speed drive) with a drive frequency of 1 Hz, for example, is performed, the display quality is not deteriorated due to the leakage current. That is, favorable display quality is maintained. From the above, according to the present embodiment, an organic EL display device including the pixel circuit 20 that enables both high-frequency drive and low-frequency drive without causing deterioration in display quality is achieved.

<1.6 Modification>

A modification of the first embodiment will be described below. However, differences from the first embodiment will be mainly described.

Figure 11:
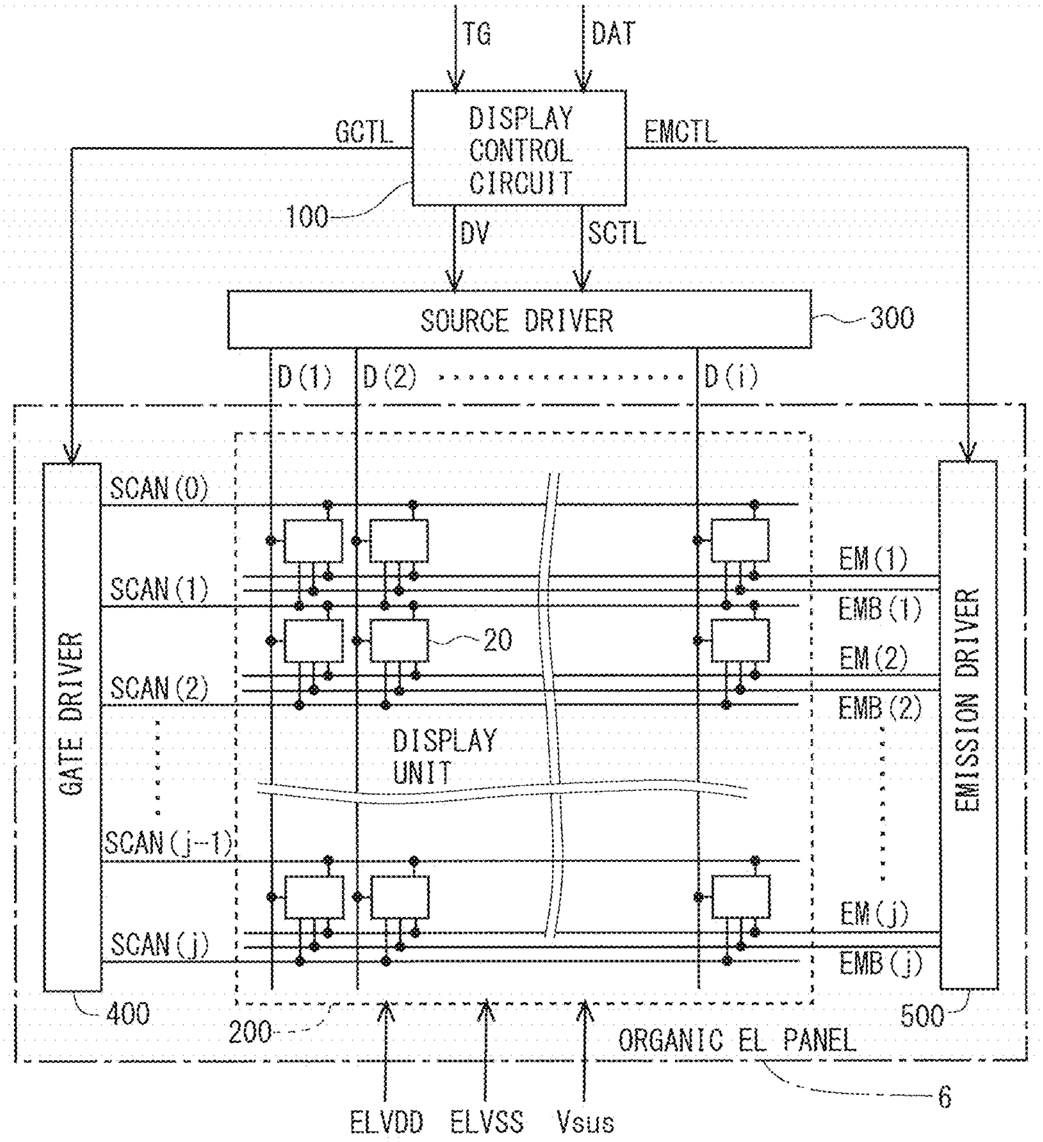
FIG. 11 is a block diagram illustrating an overall configuration of an organic EL display device according to a modification of the first embodiment.

FIG. 11 is a block diagram illustrating an overall configuration of an organic EL display device according to a modification of the first embodiment. In the present modification, signal wiring for transmitting a logical inversion signal of the emission control signal EM (hereinafter, the signal wiring is referred to as a "reset control line") is disposed in the display unit 200. Specifically, j reset control lines EMB(1) to EMB(j) are disposed in the display unit 200 so as to correspond one-to-one to j emission control lines EM(1) to EM(j). In this manner, in the present modification, the j reset control lines EMB(1) to EMB(j) are disposed in the display unit 200 in addition to the i data signal lines D(1) to D(i), the (j+1) scanning signal lines SCAN(0) to SCAN (j), and the j emission control lines EM(1) to EM(j). In the following description, reference numerals EMB(1) to EMB (j) may also be attached to reset control signals (the logical inversion signals of the emission control signal EM) transmitted by the j reset control lines EMB(1) to EMB(j).

Figure 12:
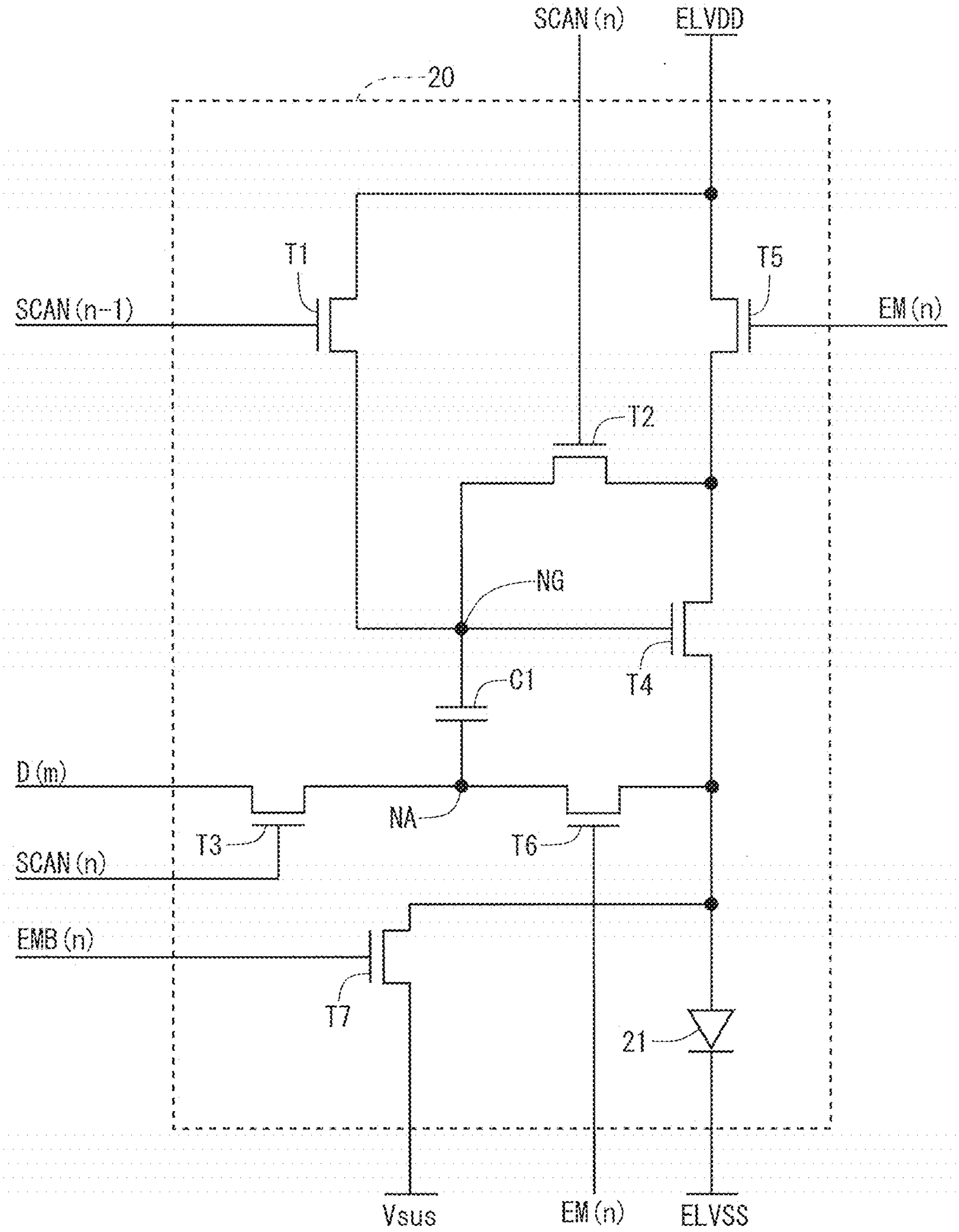
FIG. 12 is a circuit diagram illustrating a configuration of a pixel circuit in an nth row and an mth column in a modification of the first embodiment.

FIG. 12 is a circuit diagram illustrating a configuration of a pixel circuit 20 in the nth row and the mth column. As in the first embodiment (cf. FIG. 1), the pixel circuit 20 includes one organic EL element 21, seven transistors (typically thin-film transistors) T1 to T7 (first initialization transistor T1, threshold voltage compensation transistor T2, write control transistor T3, drive transistor T4, first emission control transistor T5, second emission control transistor T6, second initialization transistor T7), and one holding capacitor C1. In the present modification, the control terminal of the second initialization transistor T7 is connected to the reset control line EMB(n) in the nth row. The other points are the same as those of the first embodiment.

When the second initialization transistor T7 is turned on, the anode terminal of the organic EL element 21 and the reference power line are electrically connected, and the anode voltage of the organic EL element 21 is initialized based on the reference voltage Vsus. Thus, the reset control line EMB is signal wiring for initializing the state of the anode terminal of the organic EL element 21.

In the present modification as well, an oxide TFT is employed for each of the first initialization transistor T1, the threshold voltage compensation transistor T2, and the second initialization transistor T7, and an LIPS-TFT is employed for each of the write control transistor T3, the drive transistor T4, the first emission control transistor T5, and the second emission control transistor T6.

The operation of the pixel circuit 20 illustrated in FIG. 12 will be described with reference to FIG. 13. Note that FIG.

Figures 13, 14:
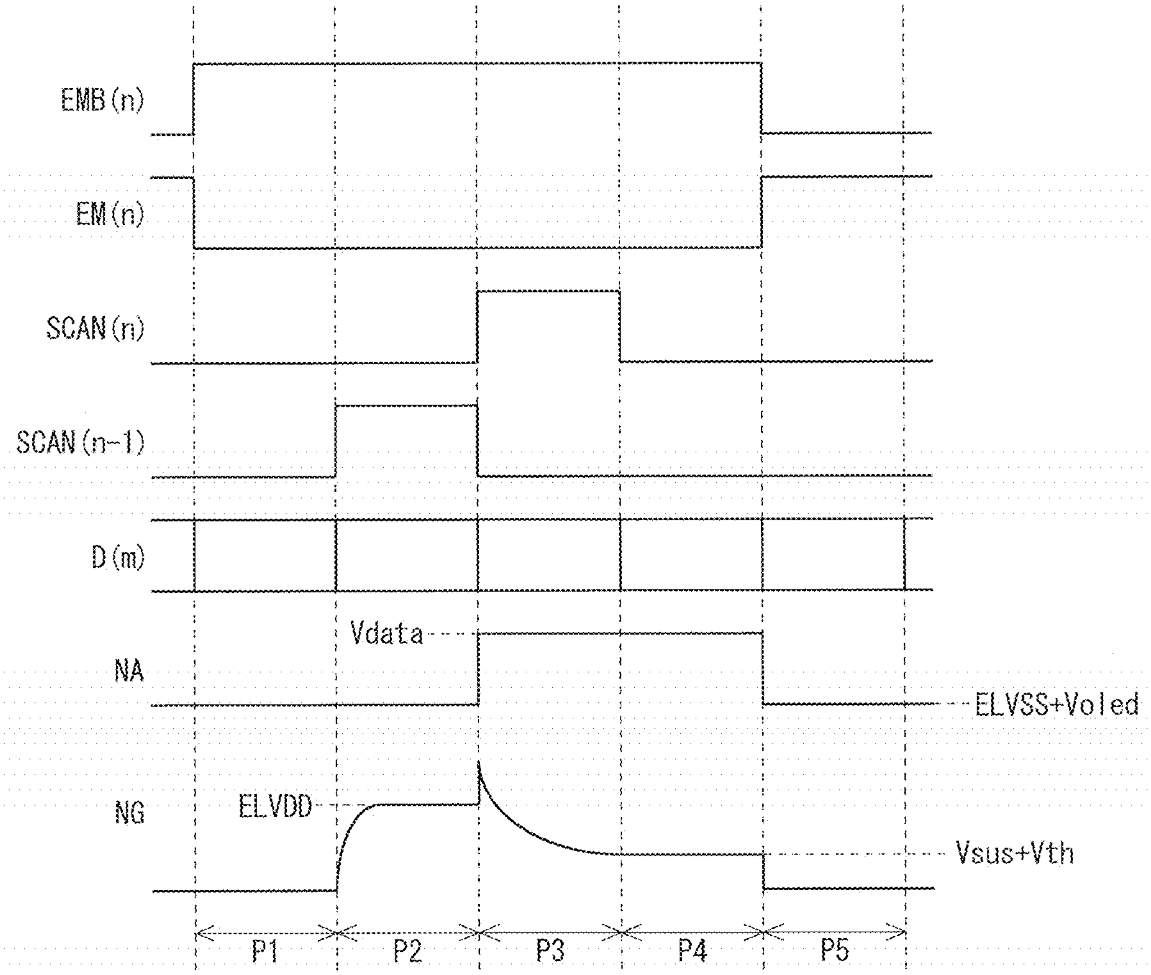
FIG. 13 is a waveform diagram for explaining the operation of the pixel circuit in the modification of the first embodiment.
FIG. 14 is a diagram illustrating a transition of a state of each transistor in the pixel circuit in the modification of the first embodiment.

14 illustrates the transition of the state (on/off-state) of each transistor (however, the drive transistor T4 is excluded) in the periods P1 to P5 in FIG. 13.

Figure 15:
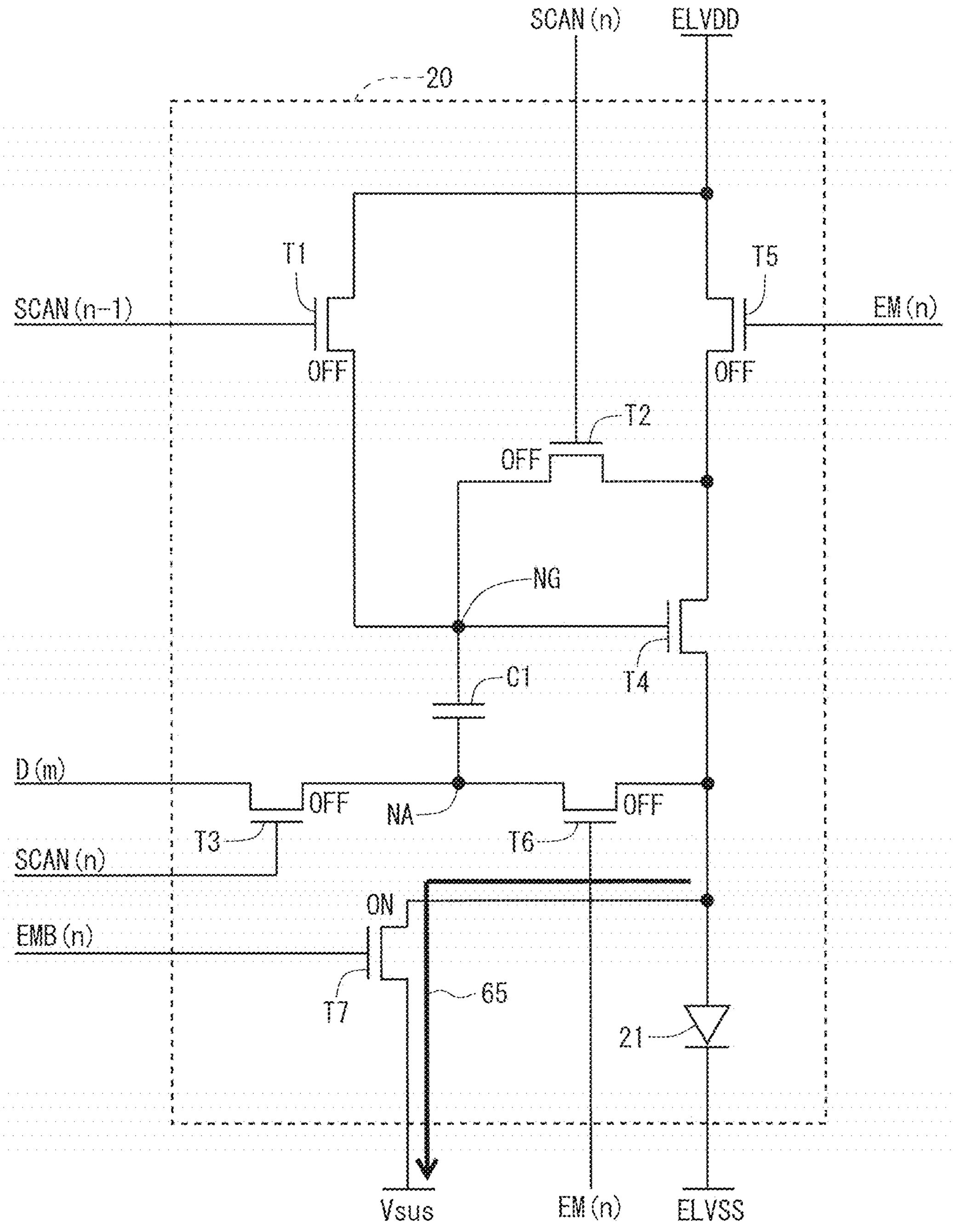
FIG. 15 is a diagram for explaining the operation of the pixel circuit in the modification of the first embodiment.

The period before period P1 is the same as that in the first embodiment. Note that the reset control signal EMB(n) is at the low level. In period P1, as in the first embodiment, the organic EL element 21 is turned off. Further, in period P1, the reset control signal EMB(n) changes from the low level to the high level. Thereby, the second initialization transistor T7 is turned on, a current is generated as indicated by an arrow denoted by reference numeral 65 in FIG. 15, and the anode voltage of the organic EL element 21 is initialized based on the reference voltage Vsus.

In period P2, as in the first embodiment, the voltage of the first control node NG (i.e., the gate voltage of the drive transistor T4) is initialized by the first initialization transistor T1 being turned on.

Figure 16:
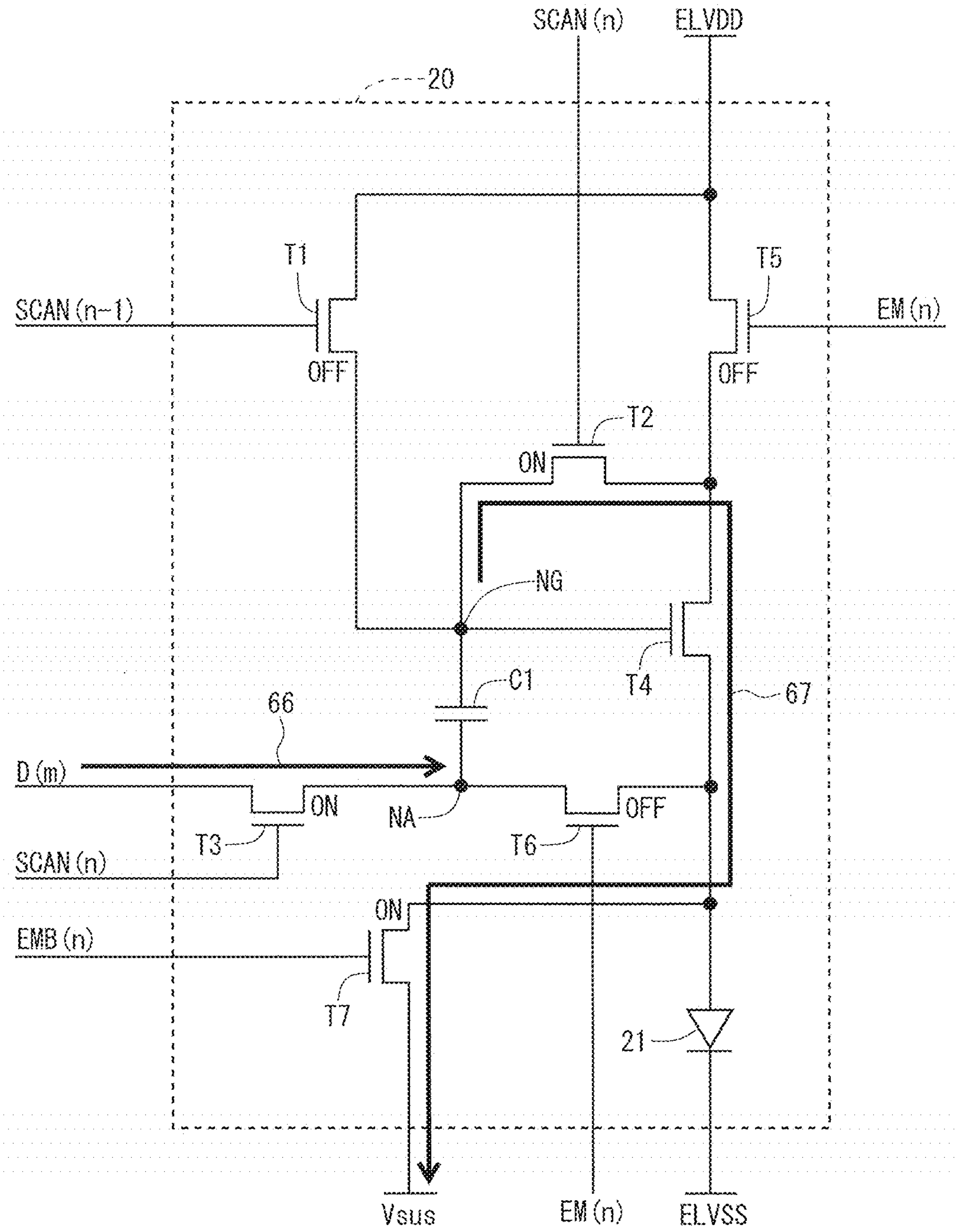
FIG. 16 is a diagram for explaining the operation of the pixel circuit in the modification of the first embodiment.

In period P3, the reset control signal EMB(n) is maintained at the high level, and the scanning signal SCAN(n) changes from the low level to the high level. Thereby, the second initialization transistor T7 is maintained in the on-state, and the threshold voltage compensation transistor T2 and the write control transistor T3 are turned on. From the above, similarly to the first embodiment, the data signal D(m) is provided to the second control node NA via the write control transistor T3 as indicated by an arrow denoted by reference numeral 66 in FIG. 16, and a current flows from the first control node NG to the reference power line as indicated by an arrow denoted by reference numeral 67 in FIG. 16. Thus, the voltage of the second control node NA changes in accordance with the data signal D(m), and the voltage of the first control node NG becomes equal to the sum of the reference voltage Vsus and the threshold voltage Vth of the drive transistor 14.

In period P4, as in the first embodiment, the voltages of the first control node NG and the second control node NA are maintained at the voltage at the end of period P3.

Figure 17:
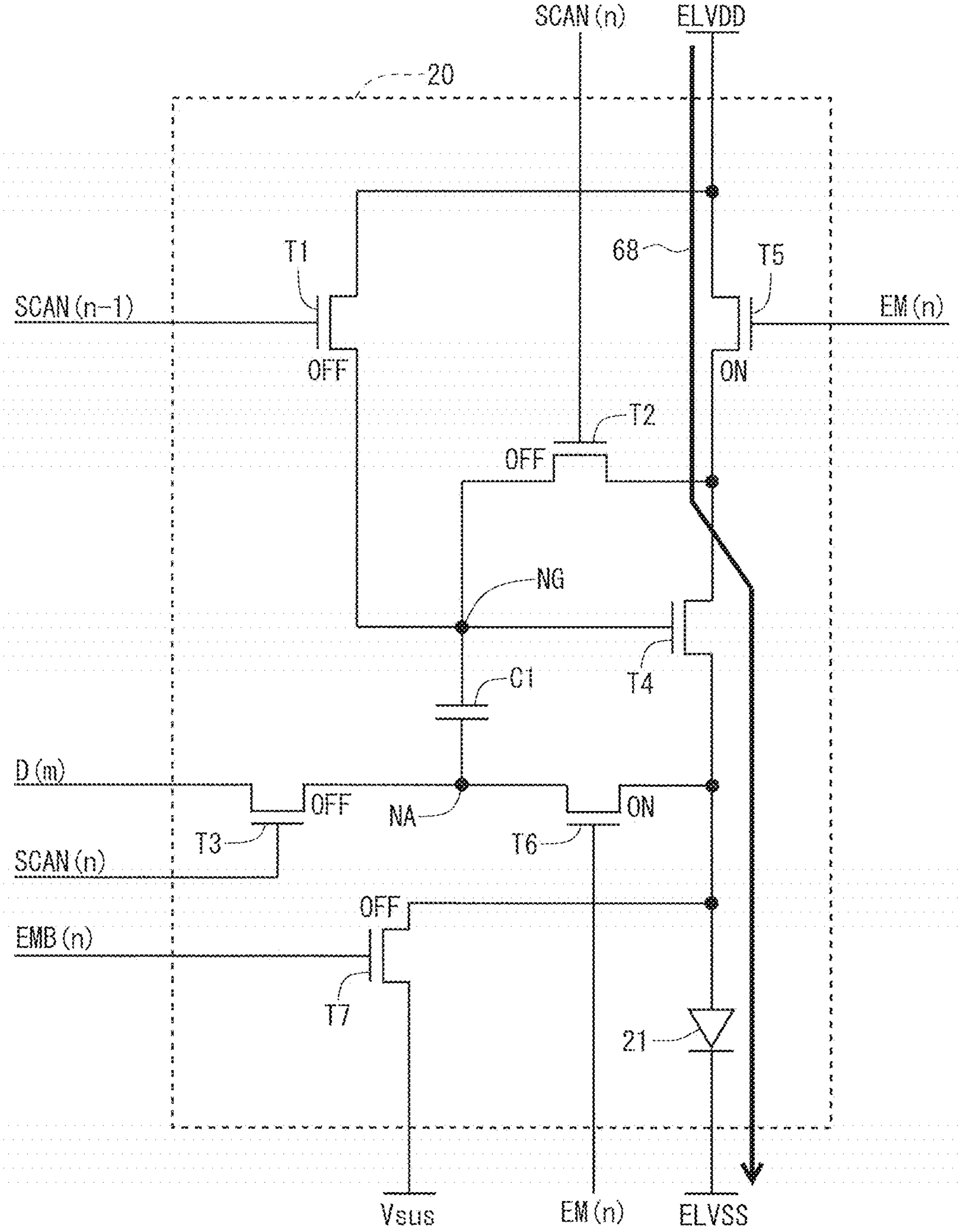
FIG. 17 is a diagram for explaining the operation of the pixel circuit in the modification of the first embodiment.

When period P5 is reached, the reset control signal EMB(n) changes from the high level to the low level. Thereby, the second initialization transistor T7 is turned off. Further, in period P5, the emission control signal EM(n) changes from the low level to the high level. Thereby, the first emission control transistor T5 and the second emission control transistor T6 are turned on, and as in the first embodiment, a drive current is supplied to the organic EL element 21 as indicated by an arrow denoted by reference numeral 68 in FIG. 17 in accordance with the magnitude of the voltage (the charging voltage of the holding capacitor C1) between the control terminal and the second conductive terminal of the drive transistor T4. As a result, the organic EL element 21 emits light in accordance with the magnitude of the drive current.

Thereafter, the state in which the organic EL element 21 emits light in accordance with the magnitude of the drive current is continued throughout the period until the emission control signal EM(n) changes from the high level to the low level.

Figure 18:
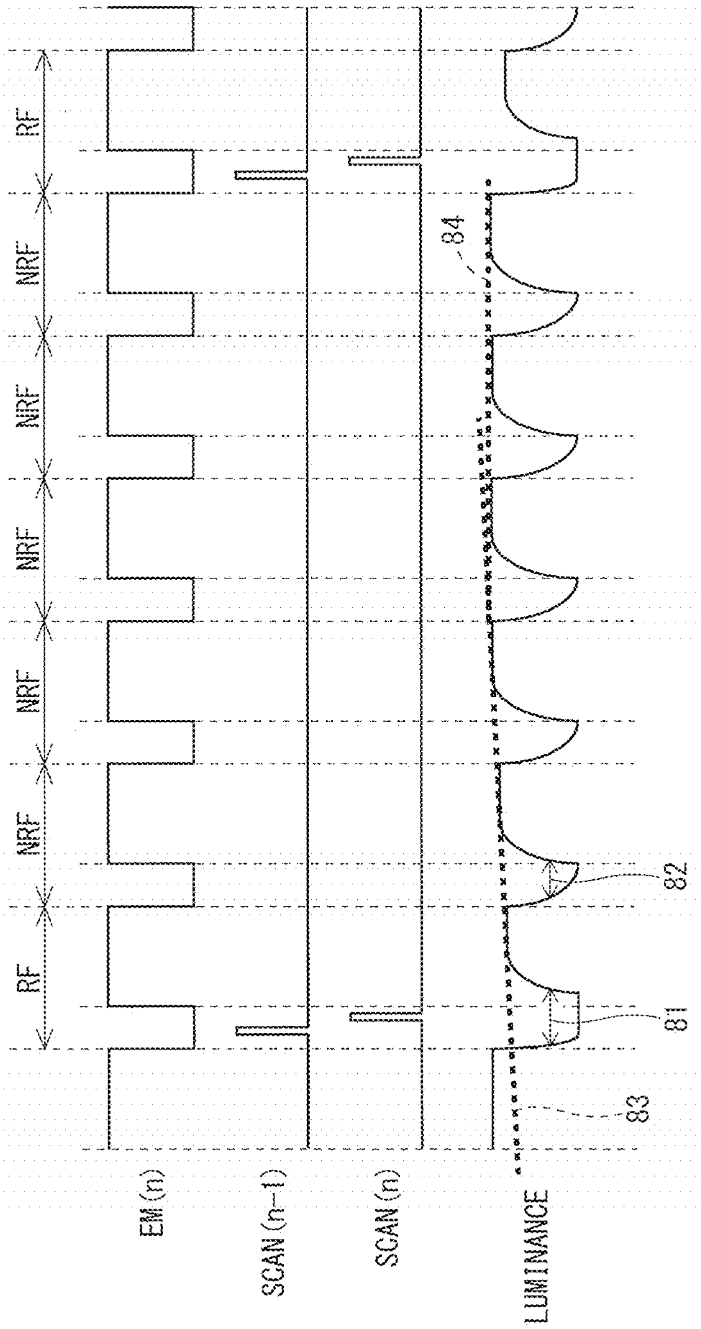
FIG. 18 is a waveform diagram for explaining the effect of the modification of the first embodiment.
Figure 19:
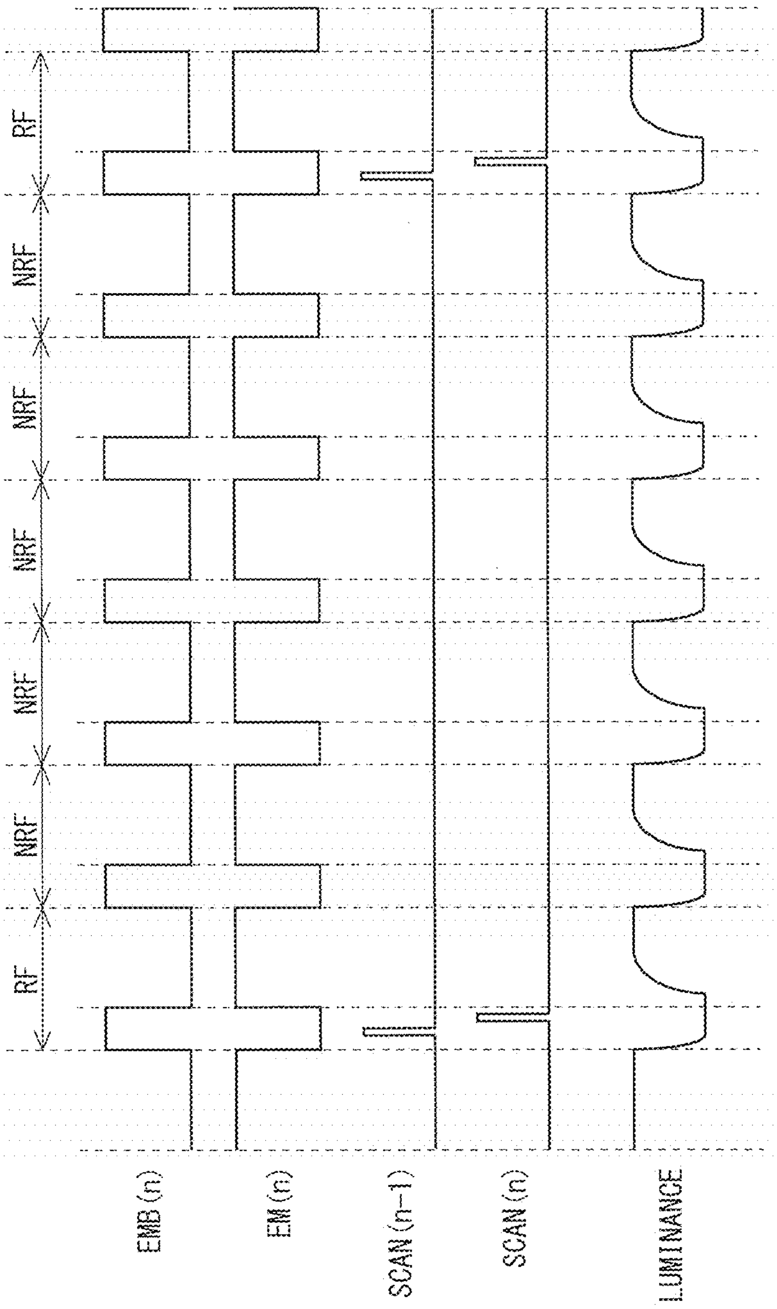
FIG. 19 is a waveform diagram for explaining the effect of the modification of the first embodiment.

According to the present modification, it is possible to obtain an effect of preventing the occurrence of flicker during the low-frequency drive as compared to the first embodiment. This will be described below with reference to FIGS. 18 and 19. FIG. 18 is a waveform diagram for explaining the operation during the low-frequency drive in the first embodiment, and FIG. 19 is a waveform diagram for explaining the operation during the low-frequency drive in the present modification. Here, attention is paid to the pixel circuit 20 in the nth row, and it is assumed that white display is performed. In FIGS. 18 and 19, a refresh frame that is a frame period in which the display screen is updated (the data signal D is written into the pixel circuit 20) is denoted by reference numeral RF, and a non-refresh frame that is a frame period in which the display screen is not updated is denoted by reference numeral NRF. Note that a period in which the emission control signal EM(n) is at the high level is an emission period, and a period in which the emission control signal EM(n) is at the low level is a non-emission period.

First, attention is paid to the first embodiment (cf. FIG. 18). In the non-emission period in the refresh frame RF, since there is a period in which the scanning signal SCAN(n) is at the high level, the anode voltage of the organic EL element 21 rapidly decreases by the second initialization transistor T7 being turned on. Hence the luminance decreases rapidly. With the anode voltage of the organic EL element 21 being initialized as above, the luminance gradually increases when transitioning from the non-emission period to the emission period in the refresh frame RF. In the non-emission period in the non-refresh frame NRF, since the second initialization transistor T7 is maintained in the off-state, the anode voltage of the organic EL element 21 is maintained as it is. Then, the luminance decreases only by the first emission control transistor T5 being turned off. Hence the luminance decreases gradually. With the anode voltage of the organic EL element 21 being maintained as it is, the luminance rapidly increases when transitioning from the non-emission period to the emission period in the non-refresh frame NRF. From the above, the length of the period in which the luminance is equal to or lower than a predetermined level is different between the refresh frame RF and the non-refresh frame NRF. More specifically, the period in which the luminance is equal to or lower than the predetermined level is relatively long as indicated by an arrow denoted by reference numeral 81 in FIG. 18 in the refresh frame RF, whereas the period is relatively short as indicated by an arrow denoted by reference numeral 82 in FIG. 18 in the non-refresh frame NRF. Due to this, several frames are required until stable luminance is obtained after the end of the refresh frame RF (cf. thick dotted lines denoted by reference numerals 83 and 84 in FIG. 18). From the above, in the first embodiment, there is a concern about the occurrence of low-frequency flicker.

Next, attention is paid to the present modification (cf. FIG. 19). In both the refresh frame RF and the non-refresh frame NRF, during the non-emission period, the reset control signal EMB(n) goes to the high level, whereby the second initialization transistor T7 is turned on. Thus, in both the refresh frame RF and the non-refresh frame NRF, the luminance rapidly decreases when transitioning from the emission period to the non-emission period, and the luminance gradually increases when transitioning from the non-emission period to the emission period. That is, the luminance changes in the same manner between the refresh frame RF and the non-refresh frame NRF. Therefore, unlike the first embodiment, the length of the period in which the luminance is equal to or less than the predetermined level is equal between the refresh frame RF and the non-refresh frame NRF. In addition, unlike the first embodiment, the on-bias stress is applied to the drive transistor T4 every frame period, so that it is possible to remove the influence of the hysteresis of the drive transistor T4. From the above, according to the present modification, the occurrence of low-frequency flicker is prevented.

2. Second Embodiment

<2.1 Overall Configuration>

Figure 20:
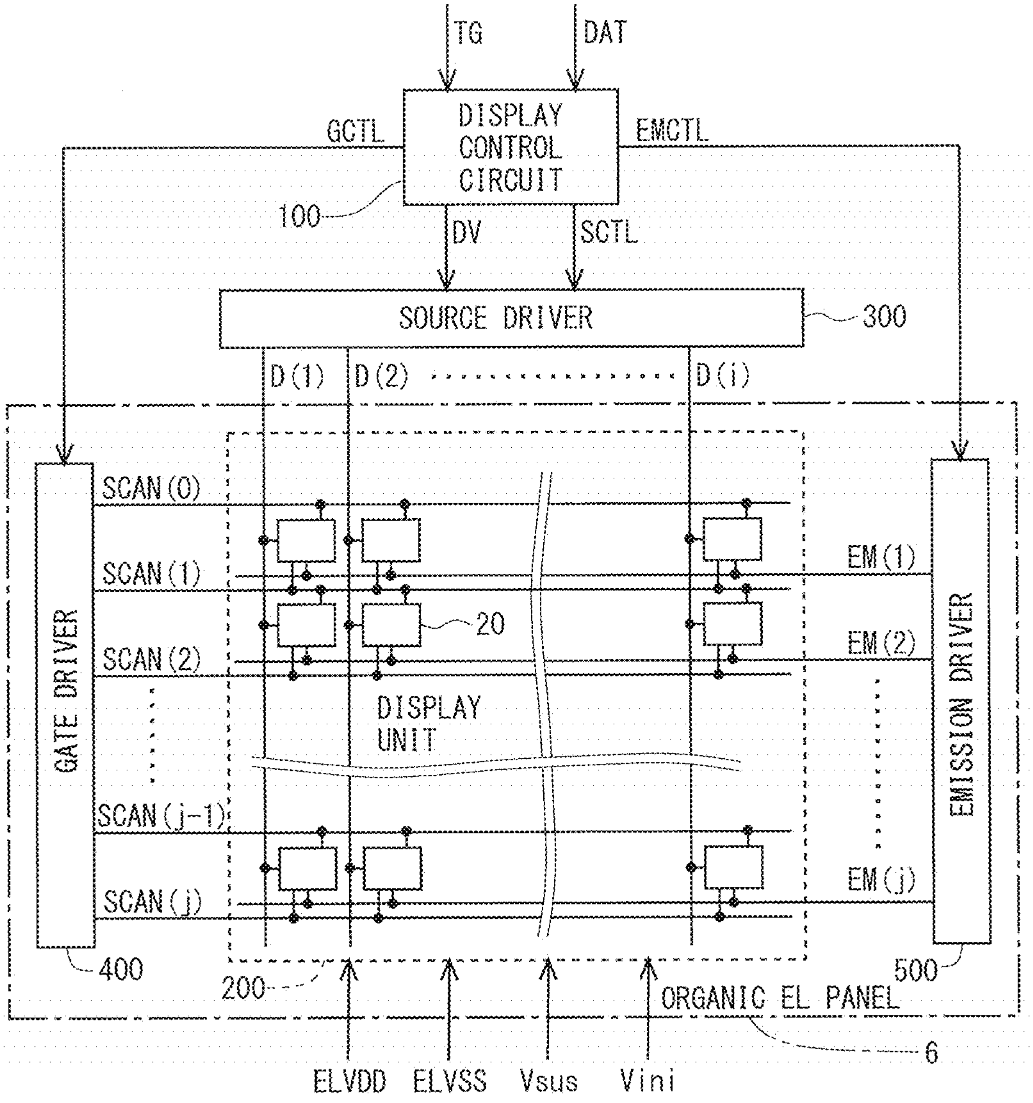
FIG. 20 is a block diagram illustrating an overall configuration of an organic EL display device according to a second embodiment.

FIG. 20 is a block diagram illustrating an overall configuration of an organic EL display device according to a second embodiment. The overall configuration of the present embodiment is substantially the same as the overall configuration of the first embodiment (cf. FIG. 2). However, in the present embodiment, a power line for supplying an initialization voltage Vini (hereinafter referred to as an “initialization power line”) is disposed in the display unit 200. The initialization voltage Vini is supplied from a power supply circuit (not illustrated).

<2.2 Configuration of Pixel Circuit>

Figure 21:
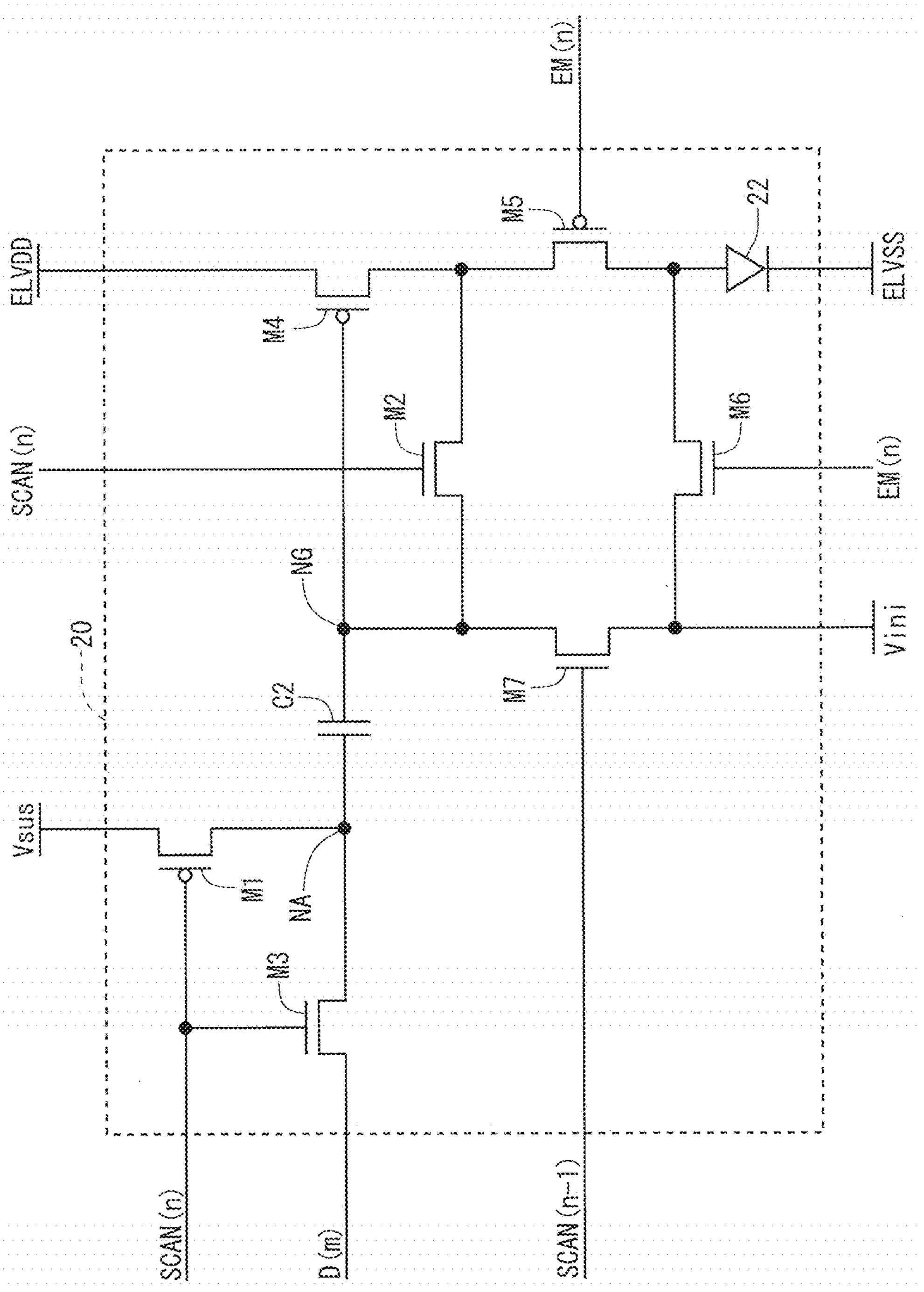
FIG. 21 is a circuit diagram illustrating a configuration of a pixel circuit in an nth row and an mth column in the second embodiment.

FIG. 21 is a circuit diagram illustrating a configuration of a pixel circuit 20 in the nth row and the mth column. The pixel circuit 20 includes one organic EL element (organic light-emitting diode) 22 as a display element (a display element driven by a current), seven transistors (typically thin-film transistors) M1 to M7 (first initialization transistor M1, threshold voltage compensation transistor M2, write control transistor M3, drive transistor M4, first emission control transistor M5, second emission control transistor M6, second initialization transistor M7), and one holding capacitor C2. The holding capacitor C2 is a capacitive element made up of two electrodes (first and second electrodes). The threshold voltage compensation transistor M2, the write control transistor M3, the second emission control transistor M6, and the second initialization transistor M7 are n-channel transistors. The first initialization transistor M1, the drive transistor M4, and the first emission control transistor M5 are p-channel transistors.

With regard to the configuration illustrated in FIG. 21, a node connected to the first conductive terminal of the threshold voltage compensation transistor M2, the control terminal of the drive transistor M4, the first conductive terminal of the second initialization transistor M7, and the first electrode of the holding capacitor C2 is referred to as a “first control node”. A node connected to the second conductive terminal of the first initialization transistor M1, the second conductive terminal of the write control transistor M3, and the second electrode of the holding capacitor C2 is referred to as a “second control node”. As in the first embodiment, the first control node is denoted by reference numeral NG, and the second control node is denoted by reference numeral NA.

The first initialization transistor M1 has a control terminal connected to the scanning signal line SCAN(n) in the nth row, a first conductive terminal connected to the reference power line, and a second conductive terminal connected to the second control node NA. The threshold voltage compensation transistor M2 has a control terminal connected to the scanning signal line SCAN(n) in the nth row, a first conductive terminal connected to the first control node NG, and a second conductive terminal connected to the second conductive terminal of the drive transistor M4 and the first conductive terminal of the first emission control transistor M5. The write control transistor M3 has a control terminal connected to the scanning signal line SCAN(n) in the nth row, a first conductive terminal connected to the data signal line D(m) in the mth column, and a second conductive terminal connected to the second control node NA. The drive transistor M4 has a control terminal connected to the first control node NG, a first conductive terminal connected to the high-level power line, and a second conductive terminal connected to the second conductive terminal of the threshold voltage compensation transistor M2 and the first conductive terminal of the first emission control transistor M5.

The first emission control transistor M5 has a control terminal connected to the emission control line EM(n) in the nth row, a first conductive terminal connected to the second conductive terminal of the threshold voltage compensation transistor M2 and the second conductive terminal of the drive transistor M4, and a second conductive terminal connected to the first conductive terminal of the second emission control transistor M6 and the anode terminal (first terminal) of the organic EL element 21. The second emission control transistor M6 has a control terminal connected to the emission control line EM(n) in the nth row, a first conductive terminal connected to the second conductive terminal of the first emission control transistor M5 and the anode terminal of the organic EL element 21, and a second conductive terminal connected to the second conductive terminal of the second initialization transistor M7 and the initialization power line. The second initialization transistor M7 has a control terminal connected to the scanning signal line SCAN(n−1) in the (n−1)th row, a first conductive terminal connected to the first control node NG, and a second conductive terminal connected to the second conductive terminal of the second emission control transistor M6 and the initialization power line. The holding capacitor C2 has a first electrode connected to the first control node NG and a second electrode connected to the second control node NA. The organic EL element 21 has an anode terminal connected to the second conductive terminal of the first emission control transistor M5 and the first conductive terminal of the second emission control transistor M6, and has a cathode terminal (second terminal) connected to the low-level power line.

In the present embodiment, an oxide TFT is employed for each of the threshold voltage compensation transistor M2, the write control transistor M3, the second emission control transistor M6, and the second initialization transistor M7, and an LTPS-TFT is employed for each of the first initialization transistor M1, the drive transistor M4, and the first emission control transistor M5.

<2.3 Drive Method (Operation of Pixel Circuit)>

Figures 22, 23:
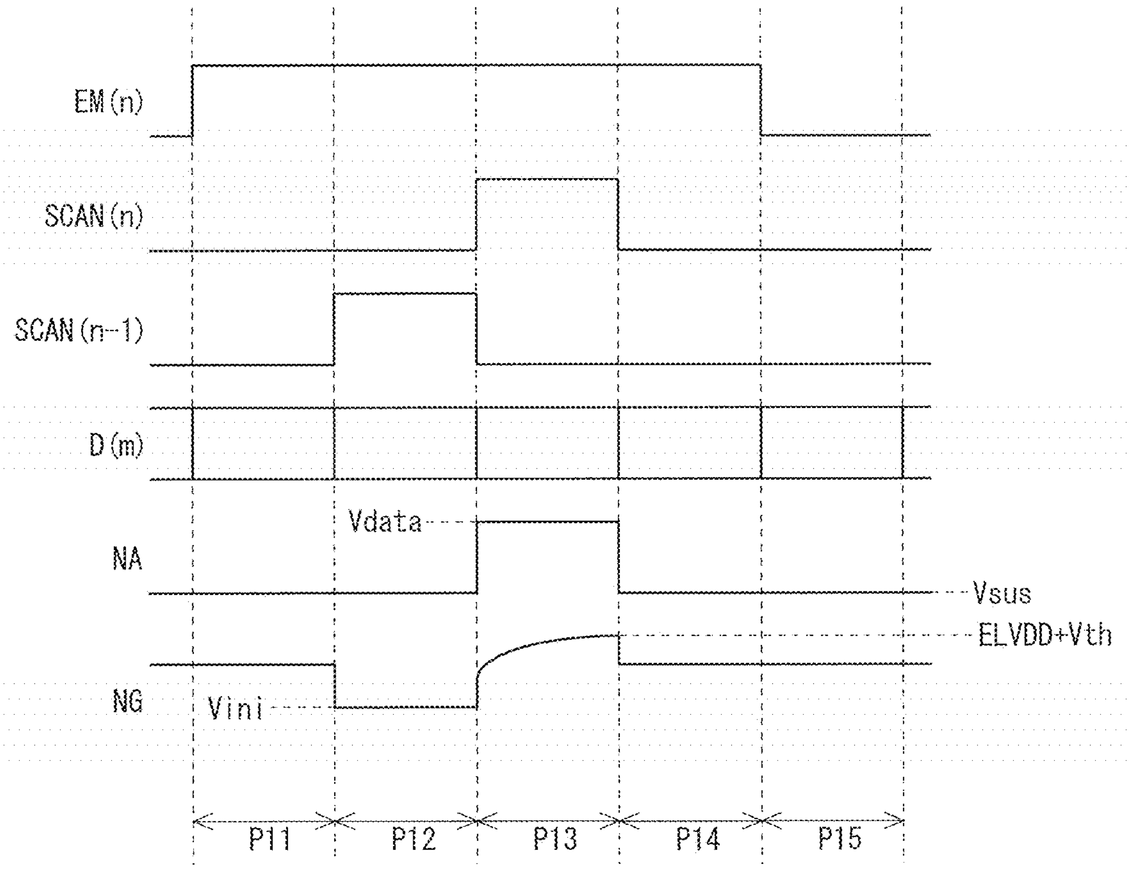
FIG. 22 is a waveform diagram for explaining the operation of the pixel circuit in the second embodiment.
FIG. 23 is a diagram illustrating a transition of a state of each transistor in a pixel circuit in the second embodiment.

Next, the operation of the pixel circuit 20 illustrated in FIG. 21 will be described with reference to FIG. 22. The transition of the state (on/off-state) of each transistor (however, the drive transistor M4 is excluded) in the periods P11 to P15 in FIG. 22 is illustrated in FIG. 23.

In a period before period P11, the emission control signal EM(n), the scanning signal SCAN(n), and the scanning signal SCAN(n−1) are at the low level. At this time, the threshold voltage compensation transistor M2, the second emission control transistor M6, and the second initialization transistor M7 are in the off-state, and the first emission control transistor M5 is in the on-state. Thus, a drive current is supplied to the organic EL element 22 in accordance with the magnitude of the voltage between the control terminal and the second conductive terminal of the drive transistor M4. Thereby, the organic EL element 22 emits light in accordance with the magnitude of the drive current. Note that the voltage of the second control node NA is equal to the reference voltage Vsus because the write control transistor M3 is in the off-state and the first initialization transistor M1 is in the on-state.

When period P11 is reached, an emission control signal EM(n) changes from the low level to the high level. Thereby, the first emission control transistor M5 is turned off, and the second emission control transistor M6 is turned on. By the first emission control transistor M5 being turned off, the supply of the drive current to the organic EL element 22 is interrupted, and the organic EL element 22 is turned off. In addition, by the second emission control transistor M6 being turned on, the anode voltage of the organic EL element 22 is initialized based on the initialization voltage Vini.

Figure 24:
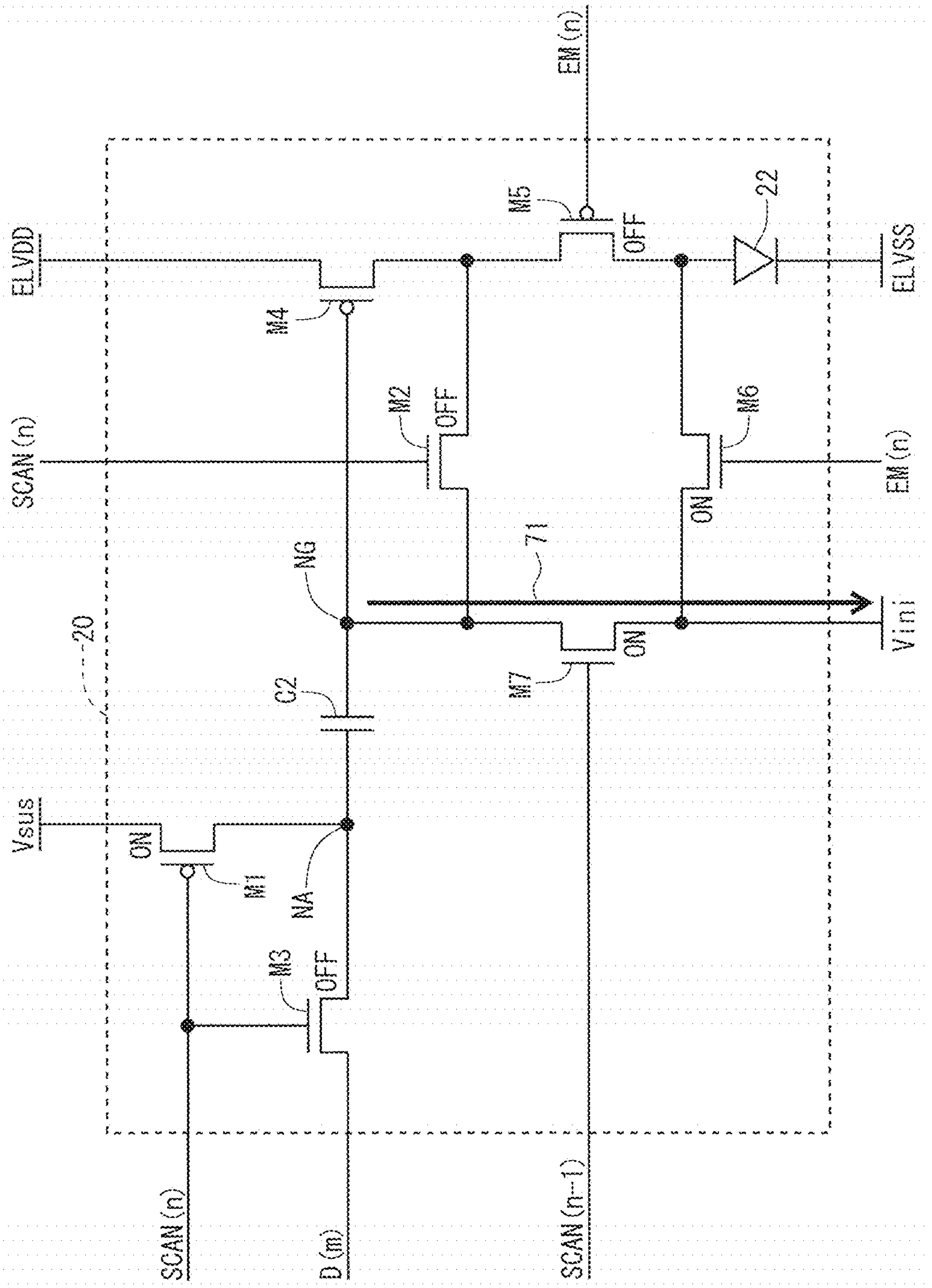
FIG. 24 is a diagram for explaining the operation of the pixel circuit in the second embodiment.

When period P12 is reached, the scanning signal SCAN (n−1) changes from the low level to the high level. Thereby, the second initialization transistor M7 is turned on, and a current flows from the first control node NG to the initialization power line as indicated by an arrow denoted by reference numeral 71 in FIG. 24. As a result, the voltage of the first control node NG becomes equal to the initialization voltage Vini. In this manner, in period P12, the voltage of the first control node NG (i.e., the gate voltage of the drive transistor M4) is initialized.

Figure 25:
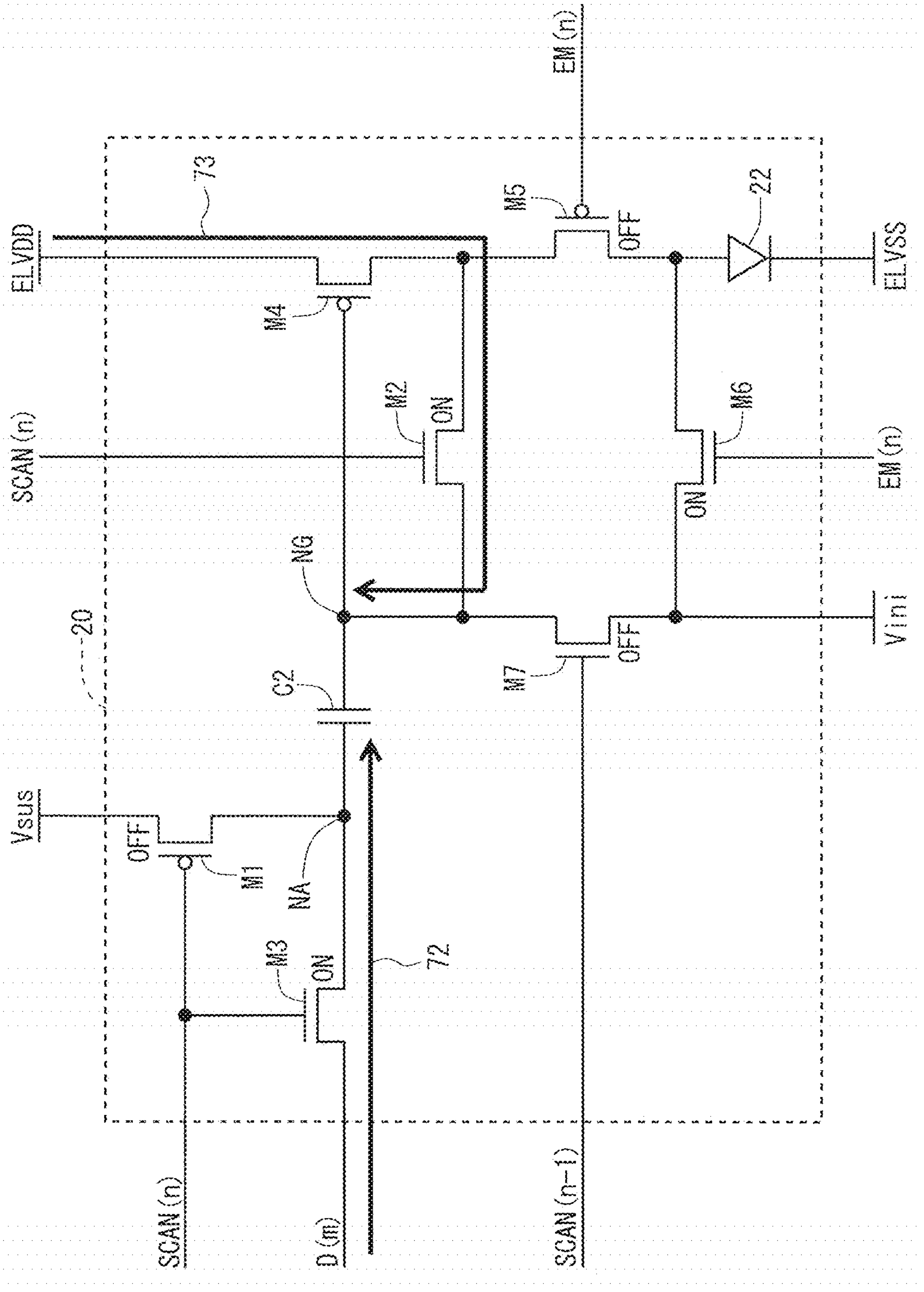
FIG. 25 is a diagram for explaining the operation of the pixel circuit in the second embodiment.

When period P13 is reached, the scanning signal SCAN (n−1) changes from the high level to the low level. Thereby, the second initialization transistor M7 is turned off, and the initialization of the voltage of the first control node NG ends. Further, when period P13 is reached, the scanning signal SCAN(n) changes from the low level to the high level. Thereby, the first initialization transistor M1 is turned off, and the threshold voltage compensation transistor M2 and the write control transistor M3 are turned on. By the first initialization transistor M1 being turned off and the write control transistor M3 being turned on, the data signal D(m) is provided to the second control node NA via the write control transistor M3 as indicated by an arrow denoted by reference numeral 72 in FIG. 25. Thus, the voltage of the second control node NA increases in accordance with the data signal D(m). Meanwhile, a holding capacitor C2 is provided between the second control node NA and the first control node NG. Hence the voltage of the first control node NG also increases in accordance with the increase in the voltage of the second control node NA. In addition, by the threshold voltage compensation transistor M2 being turned on, a current flows from the high-level power line to the first control node NG as indicated by an arrow denoted by reference numeral 73 in FIG. 25. Thereby, the voltage of the first control node NG increases gradually. Then, when the voltage between the control terminal and the second conductive terminal of the drive transistor M4 becomes equal to the threshold voltage of the drive transistor M4, the current does not flow between the first conductive terminal and the second conductive terminal of the drive transistor M4, and the increase in the voltage of the first control node NG stops. Specifically, the voltage of the first control node NG increases until becoming equal to the sum of the high-level power supply voltage ELVDD and the threshold voltage Vth of the drive transistor M4. As above, in period P13, the holding capacitor C2 is charged in accordance with the data signal D(m).

Figure 26:
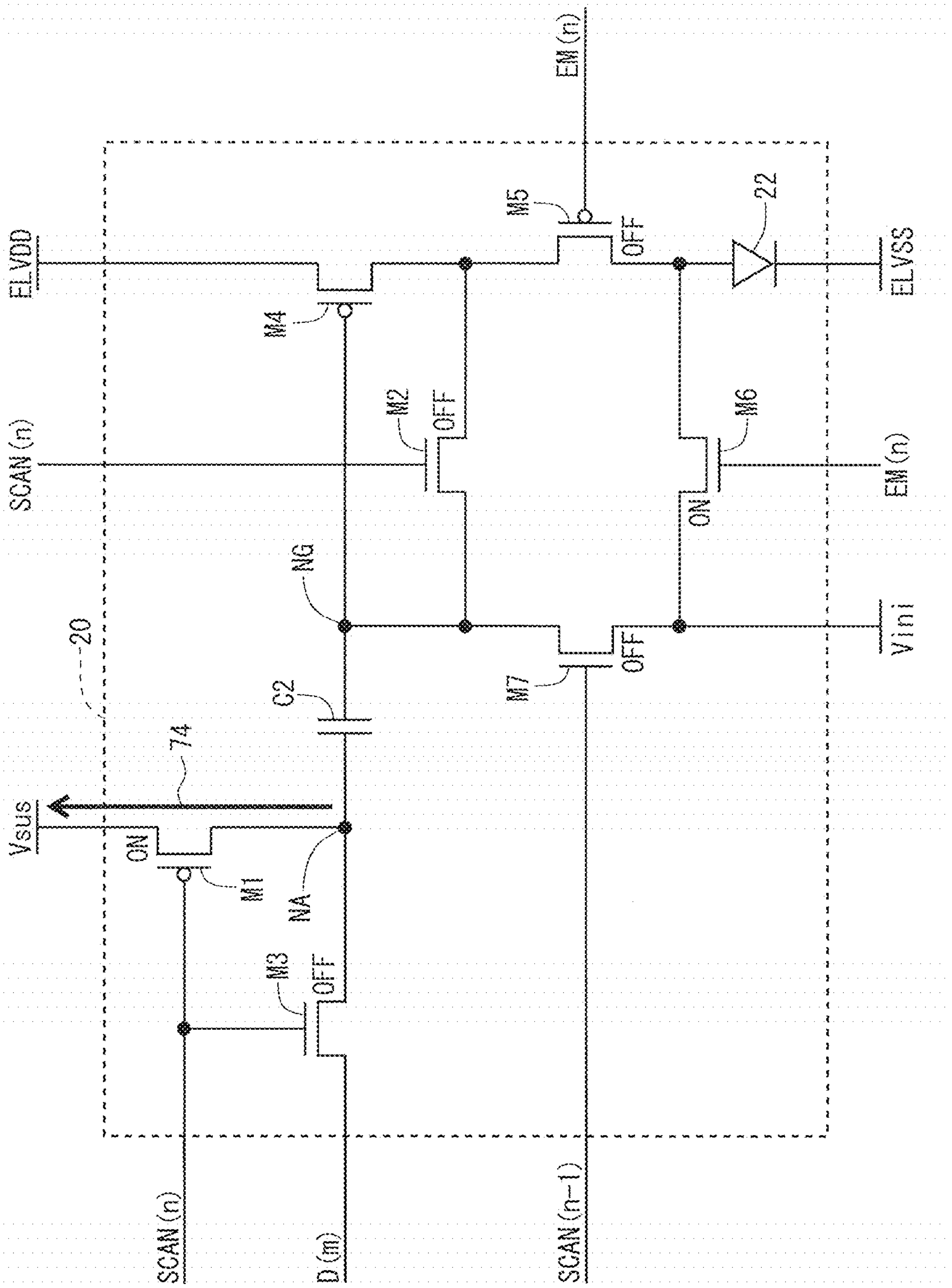
FIG. 26 is a diagram for explaining the operation of the pixel circuit in the second embodiment.

When period P14 is reached, the scanning signal SCAN (n) changes from the high level to the low level. Thereby, the threshold voltage compensation transistor M2 and the write control transistor M3 are turned off, and the first initialization transistor M1 is turned on. By the write control transistor M3 being turned off and the first initialization transistor M1 being turned on, a current flows from the second control node NA to the reference power line as indicated by an arrow denoted by reference numeral 74 in FIG. 26. Thus, the voltage of the second control node NA decreases until becoming equal to the reference voltage Vsus. At this time, due to the presence of the holding capacitor C2, the voltage of the first control node NG also decreases.

Figure 27:
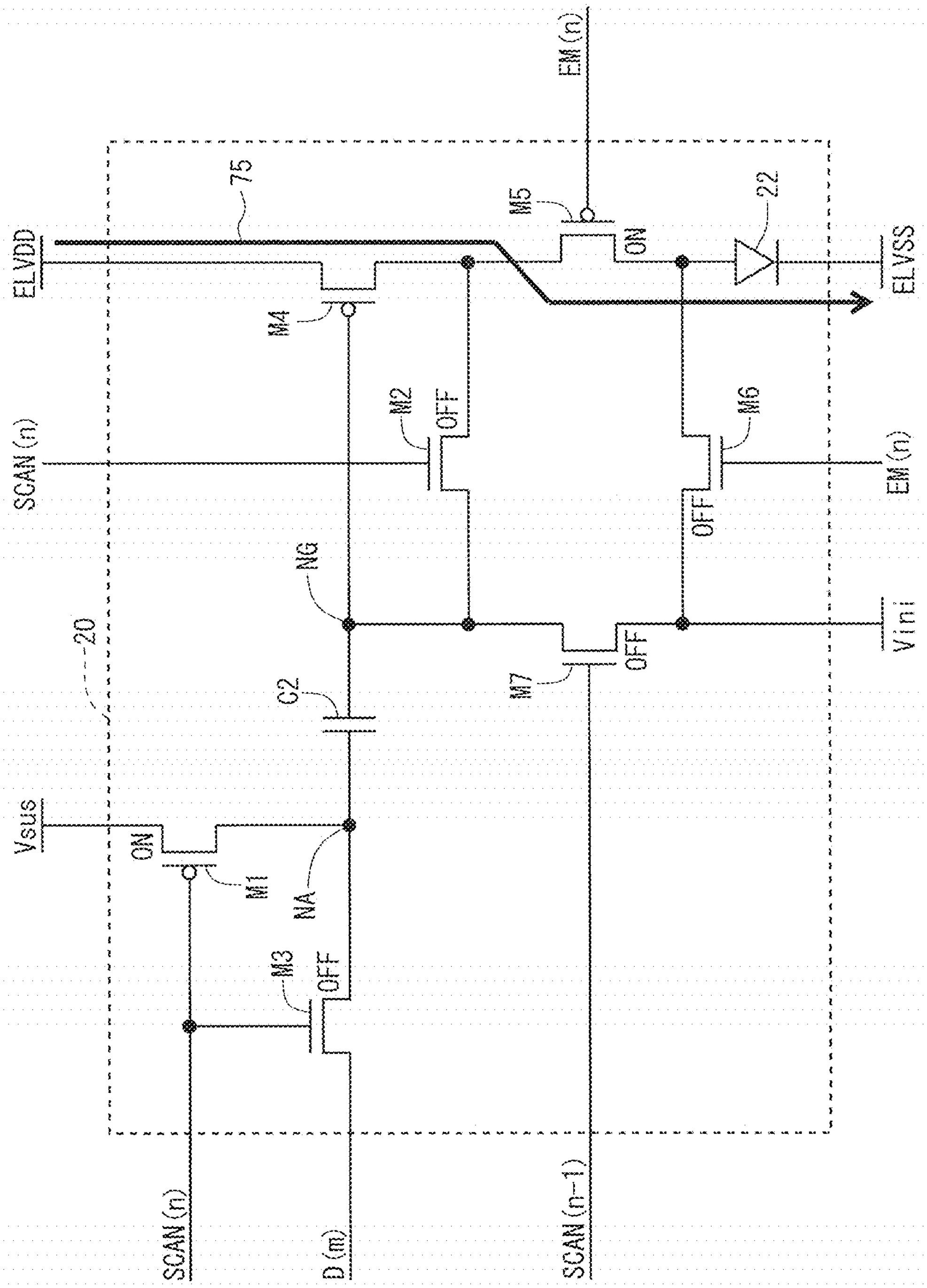
FIG. 27 is a diagram for explaining the operation of the pixel circuit in the second embodiment.
Figure 28:
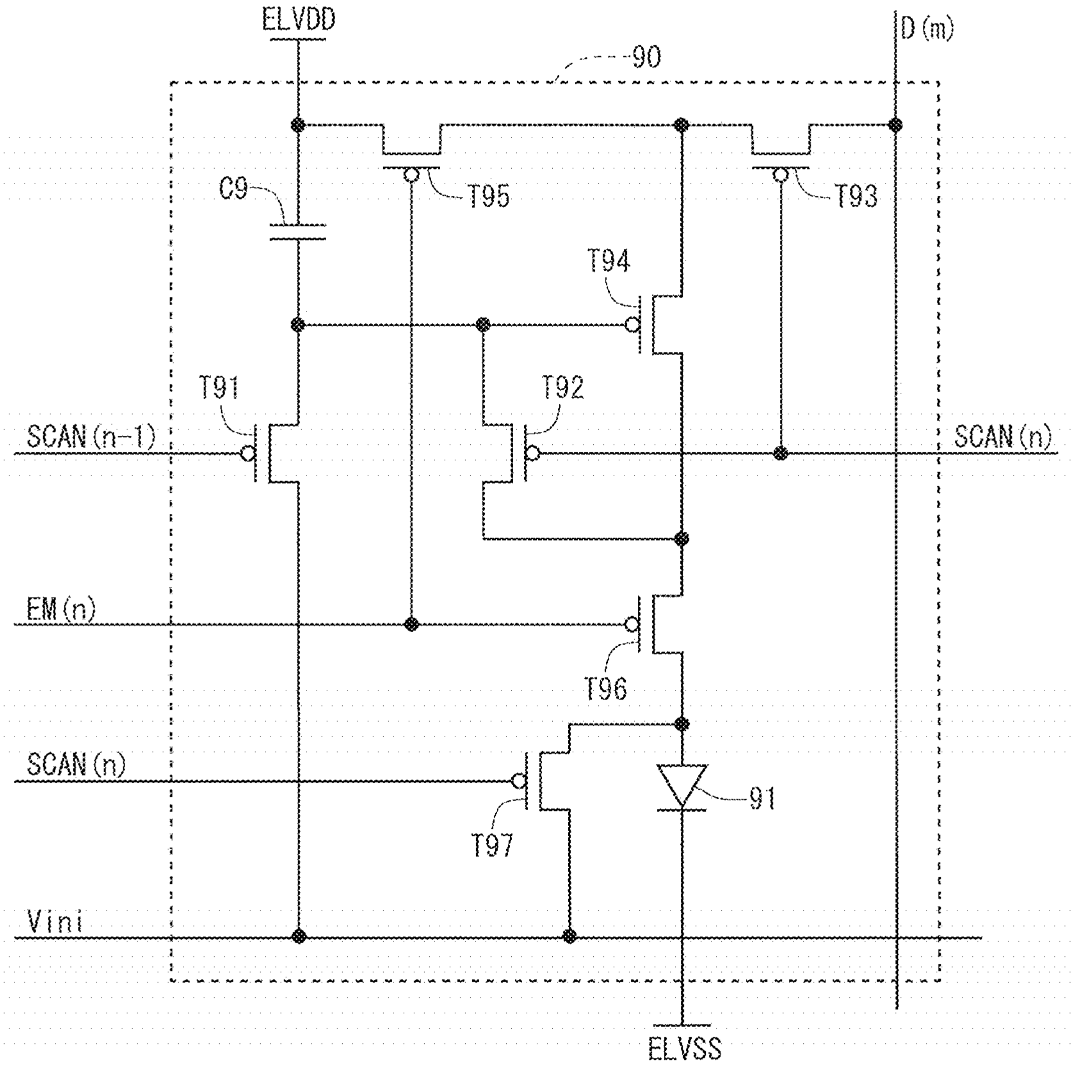
FIG. 28 is a circuit diagram illustrating a configuration of a pixel circuit in a known example.
Figure 29:
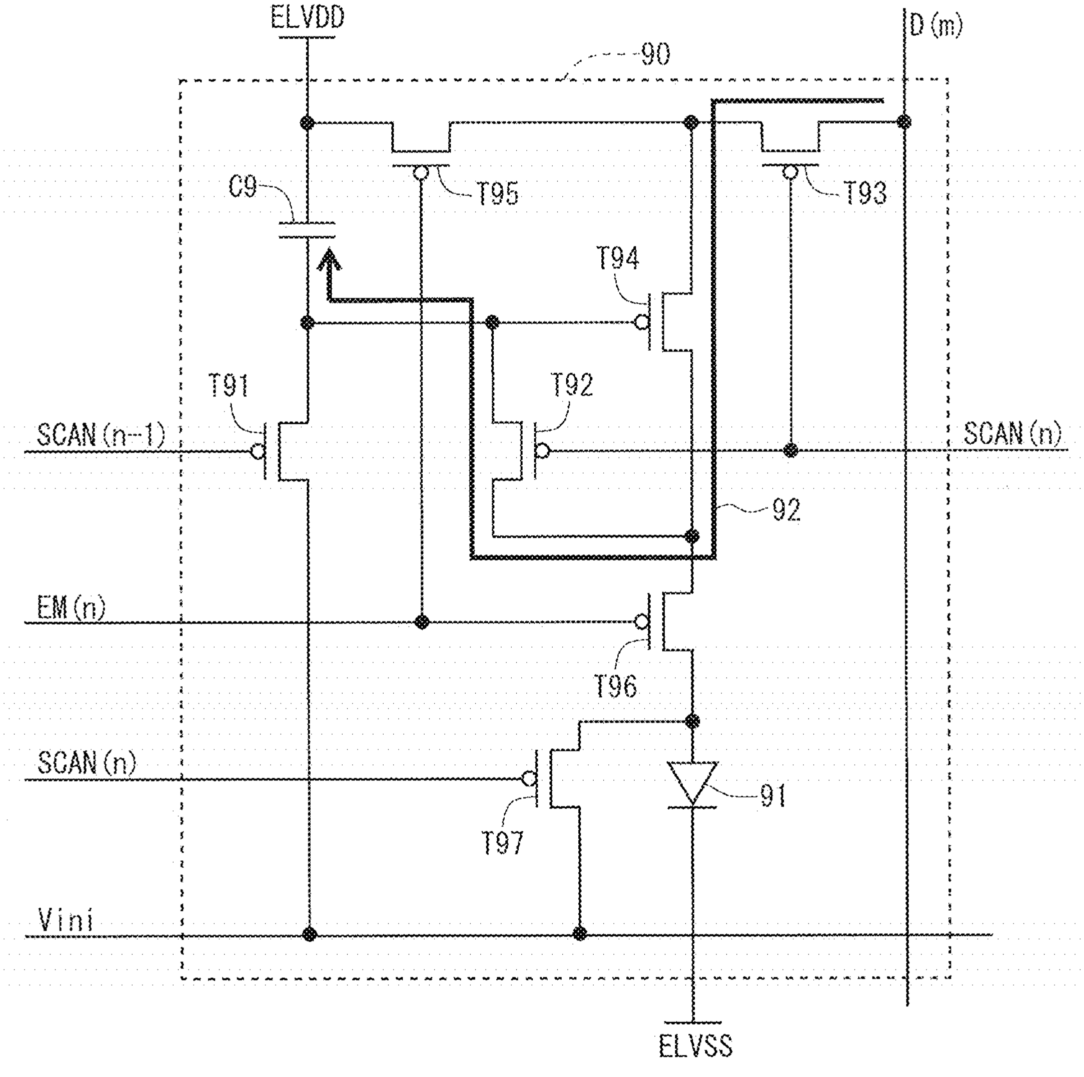
FIG. 29 is a diagram for explaining the operation of the pixel circuit in the known example.

When period P15 is reached, an emission control signal EM(n) changes from the high level to the low level. Thereby, the second emission control transistor M6 is turned off, and the first emission control transistor M5 is turned on. As a result, a drive current is supplied to the organic EL element 22 as indicated by an arrow denoted by reference numeral 75 in FIG. 27 in accordance with the magnitude of the voltage between the control terminal and the second conductive terminal of the drive transistor M4. Thereby, the organic EL element 22 emits light in accordance with the magnitude of the drive current.

Thereafter, the state in which the organic EL element 22 emits light in accordance with the magnitude of the drive current is continued throughout the period until the emission control signal EM(n) changes from the high level to the low level.

<2.4 Effects>

According to the present embodiment, with regard to the configuration of the pixel circuit 20, the holding capacitor C2 is provided between the second control node NA connected to the data signal line D via the write control transistor M3 and the first control node NG connected to the control terminal of the drive transistor M4. With such a configuration, the holding capacitor C2 is charged not via the drive transistor M4. That is, the holding capacitor C2 is charged quickly. In addition, since it is sufficient that the voltage of the data signal D is determined by the time when the threshold voltage compensation transistor M2 changes from the on-state to the off-state, the display quality does not deteriorate unless a large delay occurs in the waveform change of the data signal D. Furthermore, with the LTPS-TFT being employed for the drive transistor M4, the first control node NG is quickly charged in period P13 (cf. FIG. 22) in which the compensation processing for compensating the threshold voltage of the drive transistor M4 is performed. From the above, even when high-frequency drive (high-speed drive) with a drive frequency of 120 Hz, for example, is performed, favorable display quality is maintained. Moreover, an oxide TFT is employed for each of the transistors having the conductive terminal connected to the first control node NG (specifically, the threshold voltage compensation transistor M2 having the first conductive terminal connected to the first control node NG, and the second initialization transistor M7 having the first conductive terminal connected to the first control node NG). Hence the generation of a leakage current in these transistors is prevented. Thus, even when low-frequency drive (low-speed drive) with a drive frequency of 1 Hz, for example, is performed, the display quality is not deteriorated due to the leakage current. That is, favorable display quality is maintained. From the above, according to the present embodiment, as in the first embodiment, an organic EL display device including the pixel circuit 20 that enables both high-frequency drive and low-frequency drive without causing deterioration in display quality is achieved.

In addition, by employing a p-channel transistor for the first initialization transistor M1 and an n-channel transistor for the threshold voltage compensation transistor M2 and the write control transistor M3, the operations of the transistors M1 to M3 can be controlled by one control line (scanning signal line SCAN). Therefore, high definition is possible.

<3. Others>

Although the organic EL display device has been described above as an example, it is not limited thereto, and the present disclosure can also be applied to an inorganic EL display device, a quantum dot light-emitting diode (QLED) display device, and the like.

DESCRIPTION OF REFERENCE CHARACTERS

6: ORGANIC EL PANEL
20: PIXEL CIRCUIT
21, 22: ORGANIC EL ELEMENT
200: DISPLAY UNIT
300: SOURCE DRIVER (DATA SIGNAL LINE DRIVE CIRCUIT)
400: GATE DRIVER (SCANNING SIGNAL LINE DRIVE CIRCUIT)
500: EMISSION DRIVER (EMISSION CONTROL LINE DRIVE CIRCUIT)
D(1) to D(i): DATA SIGNAL LINE, DATA SIGNAL
EM(1) to EM(j): EMISSION CONTROL LINE, EMISSION CONTROL SIGNAL
EMB(1) to EMB(j): RESET CONTROL LINE, RESET CONTROL SIGNAL
SCAN(0) to SCAN(j): SCANNING SIGNAL LINE, SCANNING SIGNAL
NG: FIRST CONTROL NODE
NA: SECOND CONTROL NODE
C1, C2: HOLDING CAPACITOR
T1, M1: FIRST INITIALIZATION TRANSISTOR
T2, M2: THRESHOLD VOLTAGE COMPENSATION TRANSISTOR
T3, M3: WRITE CONTROL TRANSISTOR
T4, M4: DRIVE TRANSISTOR
T5, M5: FIRST EMISSION CONTROL TRANSISTOR
T6, M6: SECOND EMISSION CONTROL TRANSISTOR
T7, M7: SECOND INITIALIZATION TRANSISTOR

The invention claimed is:

1. A display device provided with a pixel circuit including a display element driven by a current, the display device comprising a display unit that includes a plurality of the pixel circuits in a plurality of rows and a plurality of columns, a plurality of data signal lines configured to supply data signals to pixel circuits in respective columns, a plurality of scanning signal lines configured to control writing of the data signals into pixel circuits in respective rows, a plurality of emission control lines configured to control whether to supply a current to the display element included in the pixel circuits in the respective rows, a first power line configured to supply a high-level power supply voltage, a second power line configured to supply a low-level power supply voltage, and a reference power line configured to supply a reference voltage, wherein the pixel circuit includes a first control node, a second control node, the display element having a first terminal and having a second terminal connected to the second power line, a first initialization transistor having a control terminal connected to one of the plurality of scanning signal lines, a first conductive terminal connected to the first power line, and a second conductive terminal connected to the first control node, a threshold voltage compensation transistor having a control terminal connected to one of the plurality of scanning signal lines, a first conductive terminal connected to the first control node, and a second conductive terminal, a write control transistor having a control terminal connected to one of the plurality of scanning signal lines, a first conductive terminal connected to one of the plurality of data signal lines, and a second conductive terminal connected to the second control node, a drive transistor having a control terminal connected to the first control node, a first conductive terminal connected to the second conductive terminal of the threshold voltage compensation transistor, and the second conductive terminal connected to the first terminal of the display element, a first emission control transistor having a control terminal connected to one of the plurality of emission control lines, a first conductive terminal connected to the first power line, and a second conductive terminal connected to the first conductive terminal of the drive transistor, a second emission control transistor having a control terminal connected to one of the plurality of emission control line, a first conductive terminal connected to the second control node, and a second conductive terminal connected to the first terminal of the display element, a second initialization transistor having a control terminal, a first conductive terminal connected to the first terminal of the display element, and a second conductive terminal connected to the reference power line, and a holding capacitor having a first electrode connected to the first control node and a second electrode connected to the second control node, and a channel layer of the first initialization transistor and a channel layer of the threshold voltage compensation transistor are each formed of an oxide semiconductor.

2. The display device according to claim 1, wherein the oxide semiconductor is made of indium, gallium, zinc, and oxygen.

3. The display device according to claim 1, wherein the control terminal of the second initialization transistor is connected to one of the plurality of scanning signal lines.

4. The display device according to claim 3, wherein the control terminal of the first initialization transistor and the control terminal of the threshold voltage compensation transistor are connected to different scanning signal lines, the control terminal of the threshold voltage compensation transistor, the control terminal of the write control transistor, and the control terminal of the second initialization transistor are connected to the same scanning signal line, and in each of frame periods, after a scanning signal applied to a scanning signal line connected to the control terminal of the first initialization transistor is maintained at an on-level for a predetermined period, a scanning signal applied to a scanning signal line connected to the control terminal of the threshold voltage compensation transistor, the control terminal of the write control transistor, and the control terminal of the second initialization transistor is maintained at the on-level for a predetermined period.

5. The display device according to claim 1, wherein the display unit includes a plurality of reset control lines that correspond one-to-one to the plurality of emission control lines and are configured to initialize a state of the first terminal of the display element, and the control terminal of the second initialization transistor is connected to one of the plurality of reset control lines.

6. The display device according to claim 5, wherein the control terminal of the first initialization transistor and the control terminal of the threshold voltage compensation transistor are connected to different scanning signal lines, the control terminal of the threshold voltage compensation transistor and the control terminal of the write control transistor are connected to the same scanning signal line, and in each of frame periods, after a scanning signal applied to a scanning signal line connected to the control terminal of the first initialization transistor is maintained at an on-level for a predetermined period, a scanning signal applied to a scanning signal line connected to the control terminal of the threshold voltage compensation transistor and the control terminal of the write control transistor is maintained at the on-level for a predetermined period.

7. The display device according to claim 5, wherein in a period during which an emission control signal applied to each emission control line is maintained at the on-level, a reset control signal applied to a reset control line corresponding to the each emission control line is maintained at an off-level, and in a period during which the emission control signal applied to each emission control line is maintained at the off-level, the reset control signal applied to the reset control line corresponding to the each emission control lines is maintained at the on-level.

8. The display device according to claim 1, wherein a channel layer of the drive transistor is formed of low-temperature polysilicon.

9. The display device according to claim 8, wherein a channel layer of the second initialization transistor is formed of an oxide semiconductor, and channel layers of the write control transistor, the first emission control transistor, and the second emission control transistor are each formed of low-temperature polysilicon.

10. The display device according to claim 9, wherein the first initialization transistor, the threshold voltage compensation transistor, the write control transistor, the drive transistor, the first emission control transistor, the second emission control transistor, and the second initialization transistor are n-channel thin-film transistors.

11. The display device according to claim 1, wherein during a period during which the first emission control transistor and the second emission control transistor are maintained in an off-state in the pixel circuit, after the first initialization transistor is in an on-state for a predetermined period, the threshold voltage compensation transistor, the write control transistor, and the second initialization transistor are in the on-state for a predetermined period.

12. A display device provided with a pixel circuit including a display element driven by a current, the display device comprising a display unit that includes a plurality of the pixel circuits in a plurality of rows and a plurality of columns, a plurality of data signal lines configured to supply data signals to pixel circuits in respective columns, a plurality of scanning signal lines configured to control writing of the data signals into pixel circuits in respective rows, a plurality of emission control lines configured to control whether to supply a current to the display element included in the pixel circuits in the respective rows, a first power line configured to supply a high-level power supply voltage, a second power line configured to supply a low-level power supply voltage, and a reference power line configured to supply a reference voltage, wherein the pixel circuit includes a first control node, a second control node, the display element having a first terminal and having a second terminal connected to the second power line, a first initialization transistor having a control terminal connected to one of the plurality of scanning signal lines, a first conductive terminal connected to the first power line, and a second conductive terminal connected to the first control node, a threshold voltage compensation transistor having a control terminal connected to one of the plurality of scanning signal lines, a first conductive terminal connected to the first control node, and a second conductive terminal, a write control transistor having a control terminal connected to one of the plurality of scanning signal lines, a first conductive terminal connected to one of the plurality of data signal lines, and a second conductive terminal connected to the second control node, a drive transistor having a control terminal connected to the first control node, a first conductive terminal connected to the second conductive terminal of the threshold voltage compensation transistor, and the second conductive terminal connected to the first terminal of the display element, a first emission control transistor having a control terminal connected to one of the plurality of emission control lines, a first conductive terminal connected to the first power line, and a second conductive terminal connected to the first conductive terminal of the drive transistor, a second emission control transistor having a control terminal connected to one of the plurality of emission control lines, a first conductive terminal connected to the second control node, and a second conductive terminal connected to the first terminal of the display element, a second initialization transistor having a control terminal, a first conductive terminal connected to the first terminal of the display element, and a second conductive terminal connected to the reference power line, and a holding capacitor having a first electrode connected to the first control node and a second electrode connected to the second control node.

13. A display device provided with a pixel circuit including a display element driven by a current, the display device comprising a display unit that includes a plurality of the pixel circuits in a plurality of rows and a plurality of columns, a plurality of data signal lines configured to supply data signals to pixel circuits in respective columns, a plurality of scanning signal lines configured to control writing of the data signals into pixel circuits in respective rows, a plurality of emission control lines configured to control whether to supply a current to the display element included in the pixel circuits in the respective rows, a first power line configured to supply a high-level power supply voltage, a second power line configured to supply a low-level power supply voltage, an initialization power line configured to supply an initialization voltage, and a reference power line configured to supply a reference voltage, wherein the pixel circuit includes a first control node, a second control node, the display element having a first terminal and having a second terminal connected to the second power line, a first initialization transistor having a control terminal connected to one of the plurality of scanning signal lines, a first conductive terminal connected to the reference power line, and a second conductive terminal connected to the second control node, a threshold voltage compensation transistor having a control terminal connected to one of the plurality of scanning signal lines, a first conductive terminal connected to the first control node, and a second conductive terminal, a write control transistor having a control terminal connected to one of the plurality of scanning signal lines, a first conductive terminal connected to one of the plurality of data signal lines, and a second conductive terminal connected to the second control node, a drive transistor having a control terminal connected to the first control node, a first conductive terminal connected to the first power line, and a second conductive terminal connected to the second conductive terminal of the threshold voltage compensation transistor, a first emission control transistor having a control terminal connected to one of the plurality of emission control lines, a first conductive terminal connected to the second conductive terminal of the drive transistor, and a second conductive terminal connected to the first terminal of the display element, a second emission control transistor having a control terminal connected to one of the plurality of emission control lines, a first conductive terminal connected to the first terminal of the display element, and a second conductive terminal connected to the initialization power line, a second initialization transistor having a control terminal connected to one of the plurality of scanning signal lines, a first conductive terminal connected to the first control node, and a second conductive terminal connected to the initialization power line, and a holding capacitor having a first electrode connected to the first control node and a second electrode connected to the second control node, and a channel layer of the threshold voltage compensation transistor and a channel layer of the second initialization transistor are each formed of an oxide semiconductor.

14. The display device according to claim 13, wherein the oxide semiconductor is made of indium, gallium, zinc, and oxygen.

15. The display device according to claim 13, wherein a channel layer of the drive transistor is formed of low-temperature polysilicon.

16. The display device according to claim 15, wherein the threshold voltage compensation transistor, the write control transistor, the second emission control transistor, and the second initialization transistor are n-channel thin-film transistors, and the first initialization transistor, the drive transistor, and the first emission control transistor are p-channel thin-film transistors.

17. The display device according to claim 16, wherein the control terminal of the first initialization transistor and the control terminal of the second initialization transistor are connected to different scanning signal lines, the control terminal of the first initialization transistor, the control terminal of the threshold voltage compensation transistor, and the control terminal of the write control transistor are connected to the same scanning signal line, and in each of frame periods, after a scanning signal applied to a scanning signal line connected to the control terminal of the second initialization transistor is maintained at a high level for a predetermined period, a scanning signal applied to a scanning signal line connected to the control terminal of the first initialization transistor, the control terminal of the threshold voltage compensation transistor, and the control terminal of the write control transistor is maintained at the high level for a predetermined period.

18. The display device according to claim 13, wherein during a period during which the first emission control transistor is maintained in an off-state and the second emission control transistor is maintained in an on-state in the pixel circuit, after the second initialization transistor is in the on-state for a predetermined period, the first initialization transistor is in the off-state for a predetermined period, and the threshold voltage compensation transistor and the write control transistor are in the on-state for a predetermined period.

* * * * *